United States Patent [19]

Roux

[11] 4,311,989

[45] Jan. 19, 1982

[54] BINARY CONVERTER IN PARTICULAR FOR TRANSMITTERS AND RECEIVERS OF REDUCED REDUNDANCY IMAGE DATA

[75] Inventor: Evelyne Roux, Paris, France

[73] Assignee: Compagnie Industrielle des Telecommunications Cit-Alcatel, Paris, France

[21] Appl. No.: 93,099

[22] Filed: Nov. 9, 1979

[30] Foreign Application Priority Data

Nov. 9, 1978 [FR] France .................................. 78 31684

[51] Int. Cl.³ ............................................. H03K 13/24
[52] U.S. Cl. ............................... 340/347 DD; 358/261
[58] Field of Search ................ 340/347 DD; 358/261, 358/260

[56] References Cited

U.S. PATENT DOCUMENTS

| 3,016,422 | 1/1962 | Lee | 340/347 DD |
| 3,748,379 | 7/1973 | Epstein | 178/6 |
| 4,037,226 | 7/1977 | Betts | 340/347 DD |
| 4,092,675 | 5/1978 | Saran | 358/261 |

FOREIGN PATENT DOCUMENTS 1547613 11/1968 France .
2396479 1/1979 France .
2552751 3/1977 Fed. Rep. of Germany .

OTHER PUBLICATIONS

Janus, "IBM Technical Disclosure Bulletin", vol. 14, No. 1, Jun. 1971, p. 303.

Primary Examiner—Charles D. Miller
Attorney, Agent, or Firm—Sughrue, Mion, Zinn, Macpeak & Seas

[57] ABSTRACT

A converter for converting input binary words into respective code binary words according to a given transcoding law, and application of the converter to reduced redundancy image transmission systems (e.g. facsimile systems). A main counter (3) is connected via an AND gate (5) to receive fast clock pulses from a fast clock (4). The main counter is capable of counting through all possible code words, and its count state is applied via parallel connections to a transcoder circuit (6) which obeys the inverse transcoding law to the given law i.e. it acts as a decoder of code words. First code words for encoding are applied in parallel from at an input (1) and are compared by a comparator (7) with the decoded versions of the count states as given by the transcoder (6). On identity the counting is stopped by means of the AND gate (5) and the count state that gave rise to the identity is stored in a buffer register (8) for application to outputs (2).

9 Claims, 8 Drawing Figures

BINARY CONVERTER IN PARTICULAR FOR TRANSMITTERS AND RECEIVERS OF REDUCED REDUNDANCY IMAGE DATA

FIELD OF THE INVENTION

The present invention relates to a binary converter particularly applicable for use in a coder and/or a decoder. It is particularly applicable to a transmitter system, a receiver system, or a transmitter-receiver system, for facsimile signals, in which image data is transmitted with reduced redundancy.

BACKGROUND OF THE INVENTION

In a facsimile transmission installation, it is known to reduce the time needed for transmission by encoding the data resulting from scanning the image of the transmitter into words representative of run-lengths. Black or white points detected during scanning are no longer transmitted individually, but the lengths of alternate black and white runs are detected over the length of each scan line and words defining the length of each of these runs are generated. On reception, the data is reproduced on the basis of the run-length words orginally sent. This form of coding provides an initial reduction in the time needed to transmit the content of the document to be transmitted.

It is also known to reduce the transmission time further by performing transcoding of the run-length words into other words which are different from each other and are not all of the same lengths; in particular this can be done by using the coding known as Huffman code. In this mode of coding, the run-length words which occur most frequently are made to correspond to the shortest code words while, conversely, the rarest run-length words are made to correspond to longer code words. This coding has been improved in such a manner that the Huffman code words remain of reasonable length. Thus in a so-called truncated Huffman code, words corresponding to a run-length of less than a given value, e.g. 64,are made to correspond to respective Huffman code words, each different from the others. These words are known as end code words and provide finely measured data on the lengths of run which are below the defined value. Conversely, words corresponding to run-lengths greater than or equal to this value, i.e. 64 in this case, are made to correspond to two code words, one of them known as a composition code word indicative of the length of the run in 64-bit "slices", and the other one constituting an end code word indicative of the remaining length (i.e. less than 64). The composition code words are also different from each other and different from the end code words; they are representative of run lengths equal to integer multiples of 64.

Given the number of coding methods, and in particular the coding methods indicated above, highly complex electronic circuits are acquired for performing the coding and decoding necessary to use such codes.

French Pat. No. 1 547 613 in the name of Xerox Corporation, describes a coding circuit and a corresponding decoding circuit particularly useful in facsimile transmission system for reducing the number of bits to be transmitted and hence the time required for transmitting as in the Huffman coding technique, these circuits use a method which takes advantage of the differing occurrence frequencies of different lengths of strings of bits at the same level. However, in contrast to the Huffman coding technique in which different strings of bits at the same level are made to correspond to code words whose respective lengths are defined according to the probability that such a string will appear, i.e. in which it is not necessarily the case that the longer the string of bits, the longer the code word attributed thereto, whereas in the coding method used in the said patent, the code words attributed to strings of bits at the same level become longer with increasing string lengths. There is no rule in the Huffman coding technique which makes it possible to use a first code word attributed to a string of bits of a given length to deduce the next code word, that it attributed to the string of bits which is one bit longer, whereas in the coding method disclosed in the said patent, the next code word can be deduced from the first by using a counting technique for counting the extra bit or by using the technique of shifting the word one bit towards the more significant end, i.e. of increasing the word format for certain configurations of code word.

The coder described using this coding method detects the successive bits of an input string to be coded and uses a counter whose contents may be shifted, to generate the successive code words corresponding to this string of increasing length, a new code word being generated for each new bit to the string. The code words are generated by making the counter count the bits in the string, and by shifting the contents of the counter by one slip towards the more significant end for certain predetermined lengths of string.

The corresponding decoder described for reproducing the string of bits from a received code word is built around the preceding coder and uses a comparator to compare the received code word with successive code words generated in the decoder. The decoder reproduces the bits of the string defined by the received code word by continuously generating an ever increasing string of bits during decoding. At the same time, the counter used in the above coder is used in the decoder to generate successive code words corresponding to the reproduced string of bits according to the same technique of counting and shifting. A comparator compares the successive bits of the received code word with the bits of the code words generated successively by the decoder in order to detect the end of the string of reproduced bits on there being identity between the received code word and one of the locally generated code words. Both in coding and decoding alternate strings of bits are formed of ones or zeros, so a bistable which changes state at each detected identity in the comparator of the decoder defines the level (1 or 0) of the bits in the decoded and reproduced string.

Coders and decoders can be cheaply implemented on the basis of this coder. Indeed, in the present case, the decoder comprises the coder circuits together with a few other circuits. However, these coder and decoder implementations remain directly linked to the relationships which exist between a code word corresponding to a given bit string and the code word corresponding to the string which is one bit longer.

When the code words attributed to successively longer bit strings, they no longer have such a relationship from one to the next, the coder cannot generate succcessive code words from the code words corresponding to strings shorter than the string to be encoded. Likewise the lack of relationship between successive code words complicate the decoder.

The aim of the present invention is to provide a conversion circuit (coder or decoder) for converting binary words into other binary words by means of an inverse conversion circuit and inependently of any possible connexion that there may be between successive code words.

SUMMARY OF THE INVENTION

The present invention provides a binary converter for converting first binary words into respective second binary words according to a defined transcoding law, the converter comprising:

a fast clock;

a main counter having a clock input connected to the fast clock and capable of counting so that its count state passes through all possible second words;

a transcoder applying the inverse law to the defined law and connected to receive the count state of the main counter to deliver the said first words successively in response to the main counter counting through the second words; and a comparator connected to receive both the said first words to be converted and the said first words delivered successively by the transcoder to detect identity between simultaneously compared words; the state of the said main counter at the moment when identity is detected by the comparator being the second word which corresponds to the said first word to be converted.

The present invention also provides a converter operating as a coder, as a decoder, or as a coder/decoder for making run length words derived from scanning a document correspond to code words encoded using a truncated Huffman code.

Embodiments of the present invention are described by way of example with reference to the accompanying drawings.

DESCRIPTION OF PREFERRED EMBODIMENTS

Figure 1:
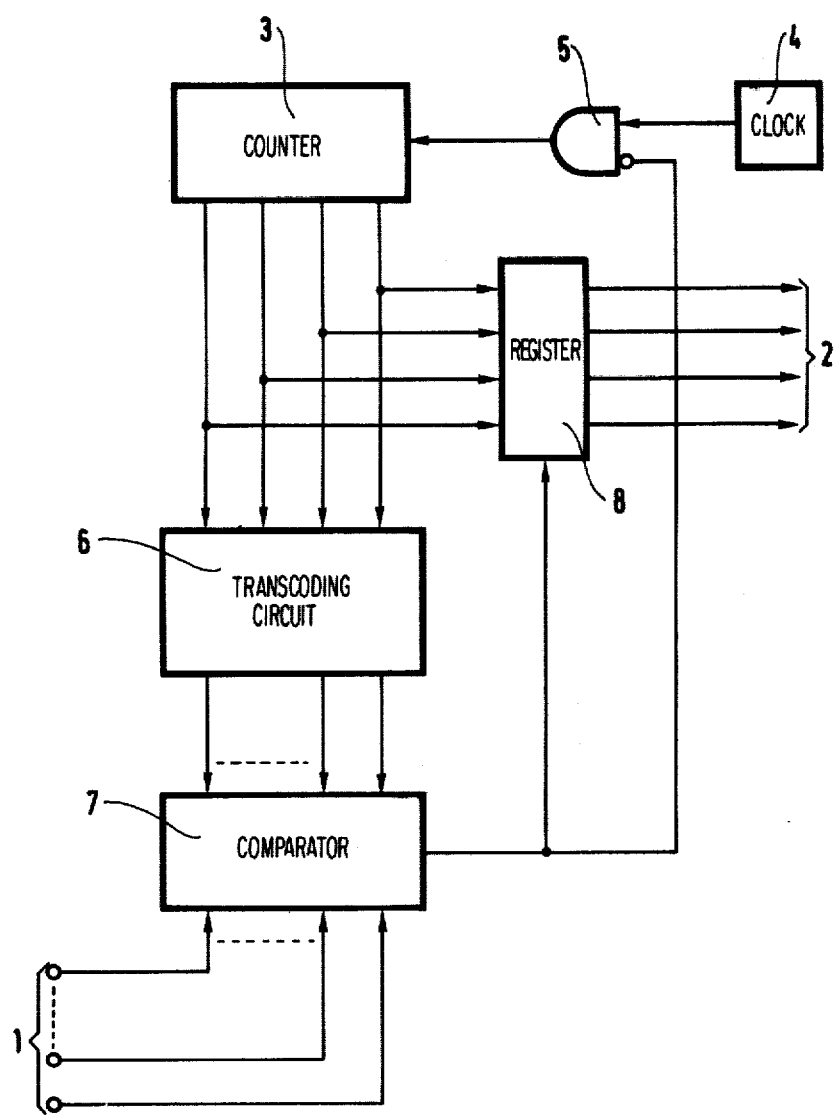
FIG. 1 is a schematic circuit diagram which shows a binary converter in accordance with the invention.

FIG. 1 is a block diagram of a converter in accordance with the invention. First binary words to be converted are applied to converter inputs 1, and in this case, the bits of each word are applied in parallel. Second binary words resulting from the conversion of the first words according to a defined transcoding law are delivered at converter outputs 2, the bits of each word being delivered in parallel.

The converter includes a counter 3 whose input is connected to a clock or time base 4 via an AND gate 5 which has one of its inputs connected to the clock 4 and its output connected to the input of the counter 3. As it counts the clock pulses it receives, the state of the counter 3 appers at its outputs in parallel. The converter also includes a known type of transcoding circuit 6, which converts words applied to its input into other words in accordance with a transcoding law which is the inverse of the law defined for the converter. The transcoding circuit has its inputs connected to the outputs of the counter 3. The converter further includes a comparator 7 which has a first set of parallel inputs receiving the bits of the words delivered by the transcoding circuit 6 and a second set of parallel inputs receiving the bits of the word to be converted as applied to the converter inputs 1. The comparator 7 detects identity between two words applied to its inputs; it has an output at which it applies a signal indicative of such identity; in this case logic level 0 indicates non-identity and logic level 1 indicates identity. The output of the comparator 7 is applied to the second input of the AND gate 5; this is an inverting input and serves to close the gate 5 and hence interrupt the application of clock pulses to the counter 3 when identity is detected between the two words applied to the comparator 7. A register 8 having parallel inputs connected to the outputs of the counter 3 and parallel outputs connected to the converter outputs 2 is enabled for loading by the signal indicating identity between the two words applied to the comparator 7. When identity is detected, the state of the counter 3 is loaded into the register 8 which then applies it to the outputs 2.

If, for example, the transcoding circuit 6 is coder (of known type), the converter shown in FIG. 1 constitutes a decoder. It operates as follows. The counter 3 is chosen such that its counting capacity is sufficient to define the longest possible decoded word corresponding to the words for decoding which may be applied to the converter inputs 1. When a word to be decoded is applied to the converter inputs 1, clock pulses applied to the counter 3 via the open AND gate 5 cause the counter to change state. As the counter changes state the words delivered successively at the outputs are binary words, one of which will constitute the decoded word corresponding to the word present at the converter inputs 1. The words delivered successively by the counter 3 are applied to the circuit 6 which converts them into coded words which are compared by the comparator 7 to the word present at the inputs 1. When the two words applied to the comparator are identical, the comparator output signal closes the AND gate 5 and enables the register 8 for loading. The counter state remains fixed and defines the required decoded word corresponding to the word at the inputs 1. This decoded word is loaded into the register 8 from which it is applied to the outputs 2. The signal delivered by the comparator 7 and representative of detected identity, could, by way of example, be arranged after a short delay following its appearance to extract the decoded word from the register, reset the counter to 0 and apply a new word for decoding to the inputs 1 of the converter. These housekeeping controls are not shown in FIG. 1 and are given purely by way of example to indicate how the converter could be made to operate continuously.

The converter shown in FIG. 1 operates in a similar manner as a coder provided the circuit 6 is a decoder. While the counter 3 is counting, it is capable of delivering all possible coded words, one of which, after being decoded, will be detected by the comparator as corresponding to the word for coding present at that moment at the converter inputs 1.

Figure 2:
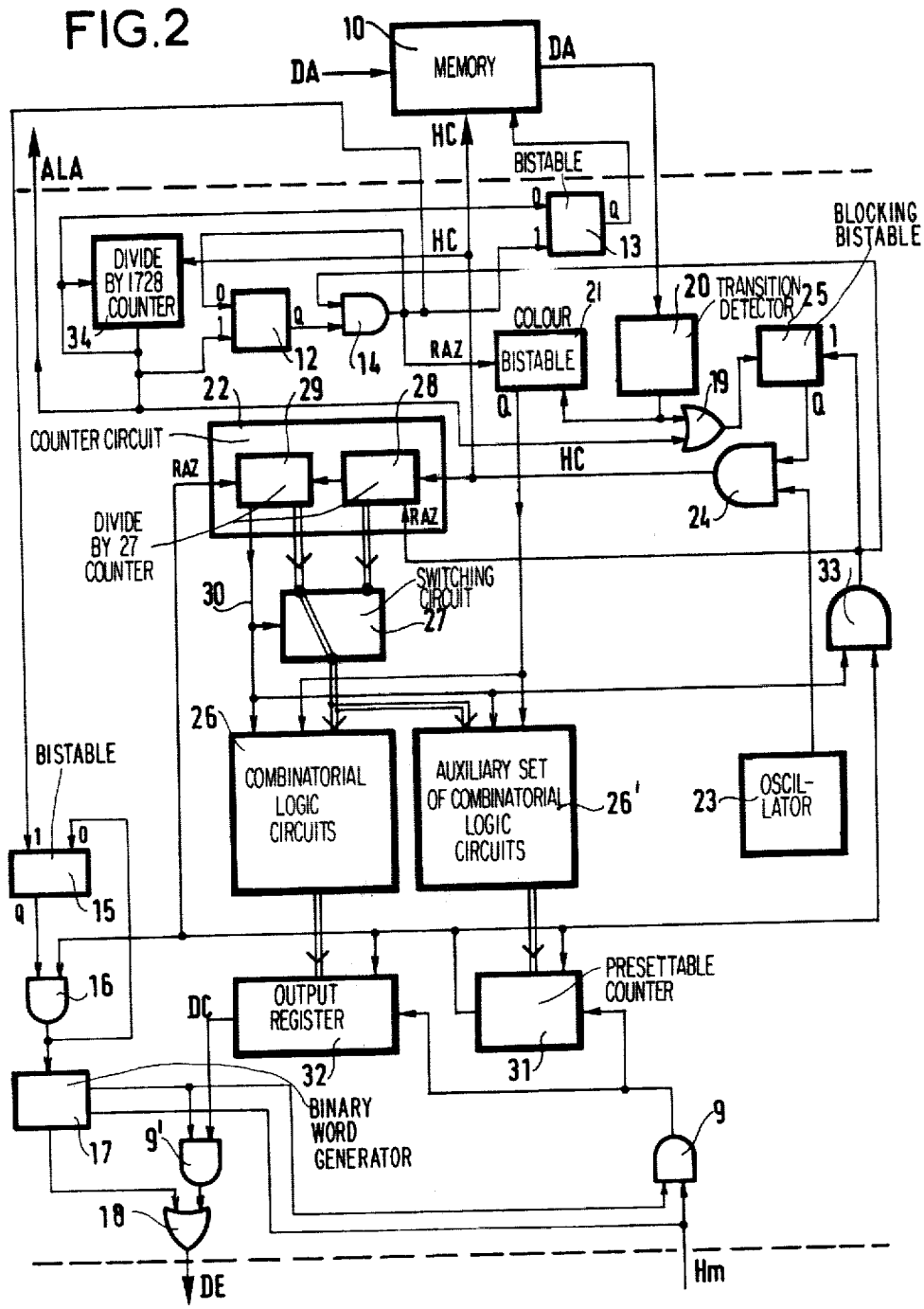
FIG. 2 is a schematic circuit diagram which shows a coder and FIG. 3 shows a decoder implemented in accordance with the invention on the basis of the coder circuit of FIG. 2.

FIG. 2 shows an implementation of a coder for use in facsimile signal transmission equipment. In addition to the coder, the transmission equipment essentially comprises a document scanner device, not shown, for deriving binary scan data at a scanning rate along each scan line of the document, and a modulator, not shown, for transmitting the facsimile signal over a telephone line. The scan data DA is transmitted to the coder via a set of memories comprising, for example, a first memory not shown, receiving data DA relating to one scan line at the scanning rate along the line, and a second memory 10, containing data relating to the preceding scan line and being read at a rate HC determined by the coder. The two memories of the set of memories are alternately in read mode and in write mode. The memory 10 represents the memory which is in write mode. Thus at a rate HC, the coder receives the data DA in the form of variable strings of 0's alternating with variable strings of 1's corresponding to alternating black and white runs along the successive scan lines of the document. The coder generates coded data DC from the data DA and delivers the line data DE constituted by strings of coded data DC corresponding to successive scan lines and separated from one line to the next by a pedetermined word referred to as a line synchronising word. The line data DE is applied by the coder to the modulator at the modulator's clock signal rate Hm for transmission to line.

The coder shown is for coding the scan data DA into binary words according to a truncated Huffman code. It includes a transition detector 20 which receives the scan data DA at its input The detector 20 detects changes from level 0 to level 1 and from level 1 to level 0 in the string of scan data bits DA, and thus detects changes between scanned black and white runs. The detector delivers a short pulse, e.g. at logic level 1, in response to each detection. The transition detector 20 is connected to a bistable 21, called a colour bistable, having an output Q whose 1 or 0 state is changed at each transition detection and is thus representative of the colour of the run defined by the data DA then being received by the detector. A counter circuit 22 receives pulses at the rate HC of the data DA as applied to the coder, and counts the lengths of the runs independently of the colour as defined by the bistable 21. The counter circuit 22 is connected to an oscillator 23 via a logic AND gate 24 which is controlled by the signal which appears at the output of a bistable 25. The bistable 25 is known as a blocking bistable, and is connected via an OR gate 19 for its Q output to be reset to 0 either by the transition detector 20 on each detected transition or by a circuit which is described in greater detail below. The bistable 25 is connected for its Q output to be set to 1 by a signal which will also described below. From the oscillator 23 which delivers a clock signal at, for example, B 5 MHz, the AND gate 24 delivers pulses which constitute the clock signal of the coder HC as applied to the circuit 22. The counter circuit 22 has a counting capacity of 1728 which corresponds to a resolution of 1728 points per scan line. The counter circuit 22 thus defines the successive run lengths defined in the data DA. When the run currently being measured comes to its end, the AND gate 24 is closed from the detector 20 via the blocking bistable 25. The components 19 to 25 constitute means for converting the scan data DA into binary words representative of successive run lengths and referred to as run-length words; these run-lengths words are delivered on parallel outputs of the counter circuit 22 which are represented as a pair of parallel lines together with an arrow.

The coder comprises a set of combinatorial logic circuits 26, preferably of programmable logic array (PLA) type, programmed to transcode the run length words which it receives from the counter circuit 22 into other words in accordance with a chosen truncated Huffman code. The set of circuits 26 receives the run length words from the counter circuit 22 via a switching circuit 27.

In the example shown, a counter circuit 22 comprises two counters: a first designated by reference 28 is a divide-by-64 counter; the other designated by the reference 29 is a divide-by-27 counter, this arrangement results from the number of scan points in a scan line, in this case equal to 1728, and from the chosen truncated Huffman code. The divide-by-64 counter 28 receives the clock signal HC and counts through 0 to 63. The divide-by-27 counter 29 is connected to the output indicative of the zero states of the counter 28 and thus counts successive passages through 0 of the counter 28 within a single run. For any one given run, the measured length is given by the counter 29 which indicates the number of multiples of 64 that are detected, thus constituting a detector of 64 unit lengths in the run, and by the counter 28 which provides an accurate measure of the remainder of the run of length less than 64.

The switching circuit 27, represented by a simple switch, may be considered as being a multiple switch having as many paths as there are outputs from the counter 28. The circuit 27 serves to transfer the state of the counter 28 onto the parallel inputs of the set 26, there being as many inputs as there are outputs from the counter 28, or alternatively it transfers the state of the counter 29 onto respective less significant ones of the preceding inputs to the set 26, the other inputs not being used in this case.

The set of combinatorial logic circuits 26 also has a first supplementary input, its "colour" input, connected to the output of the colour bistable 21 which supplies data indicative of the colour of the measured run length to be processed, and a second supplementary input to receive, as will be explained below, data concerning the position of the switching circuit 27. The set of combinatorial logic circuits 26, can, for example, be constituted by PLA circuits such as those sold under the reference 82 5100 by the firm La Radiotechnique-Compelec. All the circuits constituting the coder can be implemented as a single integrated circuit fabricated specially for the purpose. In this case, the combinatorial logic circuits are defined from coding tables expressed in canonical form of the logic sums and products of its input variables. The set of circuits 26 is programmed to transcode each of the run length words delivered by the circuit 22 in the manner shown below in table I for detected white runs and in table II for detected black runs. The transcoding performed by this set, gives in tables I and II, uses a truncated Huffman code. In order to simplify understanding of these tables the run length words therein are shown in decimal form. For each run length, the programmed set 26 takes the binary form of the word indicative of the measured run length as received together with run colour bit and deduces therefrom the corresponding word of variable length shown in the tables. It can thus be seen from tables I and II that this transcoding reduces redundancy, firstly by assigning words of variable length to the measured runs, the words of different run lengths being different from each other and also being different for runs of the same lengths but of different colour, and secondly by ensuring that the higher the probability that a run of a given length appearing the shorter the word attributed thereto.

The relationship between the length of each black or white run of the scan data DA (expressed for simplification in decimal and not in binary notation in the tables) and the resulting transcoded word using this truncated Huffman code is as follows:

TABLE I

WHITE RUNS

| DA run lengths | DE end code words | DA run lengths | DE end code words | DA run lengths | DE composition code words |
|---|---|---|---|---|---|
| 0 | 00110101 | 32 | 00011011 | 64 | 11011 |
| 1 | 000111 | 33 | 00010010 | 128 | 10010 |
| 2 | 0111 | 34 | 00010011 | 192 | 010111 |
| 3 | 1000 | 35 | 00010100 | 256 | 0110111 |
| 4 | 1011 | 36 | 00010101 | 320 | 00110110 |
| 5 | 1100 | 37 | 00010110 | 384 | 00110111 |
| 6 | 1110 | 38 | 00010111 | 448 | 01100100 |
| 7 | 1111 | 39 | 00101000 | 512 | 01100101 |
| 8 | 10011 | 40 | 00101001 | 576 | 01101000 |
| 9 | 10100 | 41 | 00101010 | 640 | 01100111 |
| 10 | 00111 | 42 | 00101011 | 704 | 011001100 |
| 11 | 01000 | 43 | 00101100 | 768 | 011001101 |
| 12 | 001000 | 44 | 00101101 | 832 | 011010010 |
| 13 | 000011 | 45 | 00000100 | 896 | 011010011 |
| 14 | 110100 | 46 | 00000101 | 960 | 011010100 |
| 15 | 110101 | 47 | 00001010 | 1024 | 011010101 |
| 16 | 101010 | 48 | 00001011 | 1088 | 011010110 |
| 17 | 101011 | 49 | 01010010 | 1152 | 011010111 |
| 18 | 0100111 | 50 | 01010011 | 1216 | 011011000 |
| 19 | 0001100 | 51 | 01010100 | 1280 | 011011001 |
| 20 | 0001000 | 52 | 01010101 | 1344 | 011011010 |
| 21 | 0010111 | 53 | 00100100 | 1408 | 011011011 |
| 22 | 0000011 | 54 | 00100101 | 1472 | 010011000 |
| 23 | 0000100 | 55 | 01011000 | 1536 | 010011001 |
| 24 | 0101000 | 56 | 01011001 | 1600 | 010011010 |
| 25 | 0101011 | 57 | 01011010 | 1664 | 011000 |
| 26 | 0010011 | 58 | 01011011 | 1728 | 010011011 |
| 27 | 0100100 | 59 | 01001010 | | |
| 28 | 0011000 | 60 | 01001011 | | |
| 29 | 00000010 | 61 | 00110010 | | |
| 30 | 00000011 | 62 | 00110011 | | |
| 31 | 00011010 | 63 | 00110100 | | |

TABLE II

BLACK RUNS

| DA run lengths | DE end code words | DA run lengths | DE end code words | DA run lengths | DE composition code words |
|---|---|---|---|---|---|
| 0 | 0000110111 | 32 | 000001101010 | 64 | 0000001111 |
| 1 | 010 | 33 | 000001101011 | 128 | 000011001000 |
| 2 | 11 | 34 | 000011010010 | 192 | 000011001001 |
| 3 | 10 | 35 | 000011010011 | 256 | 000001011011 |
| 4 | 011 | 36 | 000011010100 | 320 | 000000110011 |
| 5 | 0011 | 37 | 000011010101 | 384 | 000000110100 |
| 6 | 0010 | 38 | 000011010110 | 448 | 000000110101 |
| 7 | 00011 | 39 | 000011010111 | 512 | 0000001101100 |
| 8 | 000101 | 40 | 000001101100 | 576 | 0000001101101 |
| 9 | 000100 | 41 | 000001101101 | 640 | 0000001001010 |
| 10 | 0000100 | 42 | 000011011010 | 704 | 0000001001011 |
| 11 | 0000101 | 43 | 000011011011 | 768 | 0000001001100 |
| 12 | 0000111 | 44 | 000001010100 | 832 | 0000001001101 |
| 13 | 00000100 | 45 | 000001010101 | 896 | 0000001110010 |
| 14 | 00000111 | 46 | 000001010110 | 960 | 0000001110011 |
| 15 | 000011000 | 47 | 000001010111 | 1024 | 0000001110100 |
| 16 | 0000010111 | 48 | 000001100100 | 1088 | 0000001110101 |
| 17 | 0000011000 | 49 | 000001100101 | 1152 | 0000001110110 |
| 18 | 0000001000 | 50 | 000001010010 | 1216 | 0000001110111 |
| 19 | 00001100111 | 51 | 000001010011 | 1280 | 0000001010010 |
| 20 | 00001101000 | 52 | 000000100100 | 1344 | 0000001010011 |
| 21 | 00001101100 | 53 | 000000110111 | 1408 | 0000001010100 |
| 22 | 00000110111 | 54 | 000000111000 | 1472 | 0000001010101 |
| 23 | 00000101000 | 55 | 000000100111 | 1536 | 0000001011010 |
| 24 | 00000010111 | 56 | 000000101000 | 1600 | 0000001011011 |
| 25 | 00000011000 | 57 | 000001011000 | 1664 | 0000001100100 |
| 26 | 000011001010 | 58 | 000001011001 | 1728 | 0000001100101 |
| 27 | 000011001011 | 59 | 000000101011 | | |
| 28 | 000011001100 | 60 | 000000101100 | | |
| 29 | 000011001101 | 61 | 000001011010 | | |
| 30 | 000001101000 | 62 | 000001100110 | | |
| 31 | 000001101001 | 63 | 000001100111 | | |

The coding performed by the set 26 attributes a word known as an end code word in Huffman code to measured runs whose lengths are less than a defined limit length (in this case a length of 64 bits), while it attributes words known as composition code words to runs whose lengths are equal to or greater than the said limit. It is in order to perform this transcoding into composition code words corresponding to measurements by portions of run length, and/or end code words corresponding to detail measurement of runs or parts or runs shorter than 64 bits, that the counter circuit 22 is constituted by the two counters 28 and 29 mentioned above.

The counters 28 and 29, as connected to the set 26 via the switching circuit 27, are arranged when a run of uniform colour is being measured, to start by delivering the composition word representing the state of the divide-by-27 counter 29 in the event that this state is not zero. After establishing the composition word, the coder forms the end word on the basis of the state of the divide-by-64 counter 28. When the measurement of the length of a run of uniform colour has no effect on the state of the divide-by-27 counter 29 (the run is less than 64 bits long; the divide-by-27 counter is at zero) the end word is formed directly from the state of the divide-by-64 counter 28. For example:

a black run of length 15 is coded as 000011000 a white run of length 15 is coded as 110101 a white run of length 356 is coded as 0011011000010101 (the composition code word corresponding to the length 320 followed by the end code word corresponding to the length 36)

a white run of length 1728 is coded as 01001101100110101 (composition word corresponding to the length 1728 followed by the end code word corresponding to the length 0).

In this transcoding to a terminal code word or to a composition code word followed by the appropriate terminal code word, the zero state of the divide-by-27 counter 29, sets the position of the switching circuit 27 to the output of the divide-by-64 counter 28 until the divide-by-27 counter 29 moves to a non-zero state, in which case the switching circuit 27 is set to the outputs of the counter 29 for its initial state to be the first one to be considered. This control of the switching circuit 27 is symbolized in FIG. 2 by a special link 30 between the counter 29 and the switching circuit 27 for conveying information concerning the state of the counter 29 to the switching circuit in the form of a logical signal whose level is, for example, one when the counter 29 is in the zero state and zero otherwise. This data concerning the state of the counter 29, and thus indicative of the position of the switching circuit 27, is also applied to the second supplementary input to the set of combinatorial logic circuits 26.

An auxiliary set of combinatorial logic circuits 26', also preferably of the PLA type, is associated with the set 26. The auxilairy set 26' is connected to counters 28 and 29 via the switching circuit 27. It is programmed to transcode each received run length word from either of these counters into another word representative of the length or number of bits in the coded word (as determined by the set 26) corresponding to the orginal run length word. The auxilairy set 26' is also connected, like the set 26, to the output of the colour bistable 21 and to the link 30.

The coding circuit further includes at the output of the set of combinatorial logic circuits 26, an output register 32 and, at the output of the auxiliary set of combinatorial set of logic circuits 26', a presettable counter 31.

The output register 32 is a shift register which is loaded in parallel with the code word determined by the set 26 and shifted by a clock signal from the modulator/demodulator, not shown, of the transmitter equipment. This signal determines a rate Hm for delivering the bits of the successive code words in series to form the coded data DC. The register 32 receives the clock signal at rate Hm via an AND gate 9 which is controlled by a signal which is explained below and is arranged to close the gate during transmission of the line synchronising word. The presettable counter 31 receives the length or number of bits in each code word from the auxiliary set of combinatorial logic circuits 26' (i.e. the length of the composition code or the end code as the case might be) and it stores this number. The counter 31 receives the clock signal at rate Hm via the AND gate 9 and counts down while the shift register 32 is shifting out data at the rate Hm. An output delivering data significant of the zero state of the counter 31 is connected to the load enable input of the output register 32 and also to the preset enable input of the counter 31 to receive a new code word. This output supplying data indicative of the zero state of the counter 31 is also connected to the divide-by-27 counter 29 to reset it to zero where necessary and to an AND gate 33 and the AND gate 33 is also connected to the link 30 supplying the data indicative of the state of the divide-by-27 counter 29. The output of the AND gate 33 has a logic 1 state when both the divide-by-27 counter 29 and the presettable counter 31 are in the zero state. Since the zero state of the counter 31 leads immediately to its being preset from the set of circuit 26, the signal at the output of the AND gate 33 is constituted by a series of short pulses at level 1. These pulses, each indicative of a terminal code word being loaded into the register 32, are applied to the divide-by-64 counter 28 to reset it to zero and to the blocking bistable 25 to set it, i.e. put its output into the 1 state.

A divide-by-1728 counter 34 for counting the 1728 points or bits along a scan line, receives the clock signal of the coder at the rate HC. As it counts through 1728, the counter 34 delivers a line advance pulse ALA to the document scanner not shown, of the transmitter equipment. The pulse ALA is also applied to reset the counter 34 to zero.

The output of the counter 34 which delivers the ALA pulses (at logic level 1 for example) is connected in the coder to the blocking bistable 25 via the OR gate 19 in order to reset the blocking bistable to zero (i.e. to put its Q output to zero) at each ALA pulse; thus each time the counter 34 arrives at 1728 it causes the AND gate 24 to be closed.

For each quantity of scan data DA corresponding to one scan line, the pulses ALA are also used in the coder to initialize the output of the memory 10 to a given logic level and to set the colour bistable 21 to a given state, thereby enabling the coder to begin processing every line with a run of a predetermined colour e.g. white (and if in practice the first run is black, then the coder will begin processing with an initial white run of length zero). The pulses ALA also used to cause the line, synchronizing word to be added to each string of coded data DC that corresponds to one scan line.

For these purposes, the output of the counter 34 is connected to a "one" input of a first bistable 12 to set that bistable to the one state, and to a "zero" input of a second bistable 13 for resetting the bistable 12 to the zero state each time the counter 34 arrives at 1728. The signal at the Q output of the bistable 12 is applied to control an AND gate 14 which also receives the pulses delivered from the AND gate 33. The output of the AND gate 14 is set back to a "zero" input of the bistable 12 to reset it to zero. Thus the AND gate 14 only allows the first pulse delivered by the AND gate 33 after each passage of the counter 34 through 1728. Pulses passed by the AND gate 14 are applied to the colour bistable 21 to reset it to a given state, level 1 in the present example, and to the bistable 13 to set it to level 1. The signal at the Q output of the bistable 13 is applied to a supplementary input to the memory 10 to force the logic level of the output of the memory 10 to a given value, 0 in the present example, while said signal is itself at level zero, i.e. during the time interval that separates each passage of the counter 34 through 1728 from the first following instant at which both the divide-by-27 counter 29 and the presettable counter 31 are simultaneously in the zero state. To this end, an AND gate (not shown) is placed at the output of the memory 10 and controlled by the signal at the output of the bistable 13 as applied to the said supplementary input. The output of the AND gate 14 is also connected to a "one" input of a bistable 15 to reset it to the 1 state each time said gate delivers a pulse. The output signal of the bistable 15 controls an AND gate 16 which is also connected to the output of the counter 31 that delivers data indicative of the zero state of the said counter. The AND gate 16 is connected back to the zero input of the bistable 15 to reset it to the zero state, since the AND gate 16 delivers a short level 1 pulse during the first passage through zero of the counter 31 that occurs after each appearance of a pulse at the output via the AND gate 14. The output of the AND gate 16 is connected to a control input of a binary word generator 17 which generates the line synchronising word. The generator 17 receives the modulator clock signal Hm on another input. In response to each pulse received from the AND gate 16, the generator 17 provides the bits of the line synchronizing word in series at the rate Hm. The line synchronizing word may be constituted for example by eleven successive 0s followed by a 1, FIG. 1. On an auxiliary output the generator supplies a signal for closing the AND gate 9 for the duration of the emission of the line synchronizing word, thereby interrupting the application of the clock signal at rate Hm to the output register 32 and to the presettable counter 31. The signal on the auxiliary output of the generator 17 is applied to another AND gate 9' which is also connected to the output of the register 32 to fix the output of the gate 9' to logic level 0 during the period for which the line synchronizing word is being emitted.

An OR gate 18 having a first input connected to the generator 17 to receive the synchronizing word and a second input connected via the AND gate 9' to the output register 32 to receive the data DC, delivers the data DE, which (after re-sampling in a re-sampling bistable (not shown) driven by the clock signal Hm) is applied to the modulator for transmission to line.

In coder mode, and during the processing of a scan line, with runs being measured by the counters 28 and 29, and before the counter 34 has reached 1728, the transistion detector 20 interrupts the clock signal from the oscillator 23 by means of the blocking bistable 25 and the AND gate 24; the clock signal of the output of the AND gate 24 at the rate HC thus includes period of inactivity for "holes". The non-zero state of the divide-by-27 counter 29 keeps the AND gate 33 and the bistable 25 blocked and thus interrupts the clock signal of the coder at the rate HC. The data DA is no longer read from the memory 10 in read mode. Because of the non-zero state of the divide-by-27 counter 29, the switching circuit 27 is sent to the output of the counter 29 whose state is thus applied to the set of combinatorial logic circuits 26 and also to the set 26'. During this time, the register 32 which is loaded with the end code word of the preceding run to be processed, outputs its data via the AND gate 9' at the rate Hm as received via the AND gate 9 while the counter 31 counts down at the same rate from the length of this code word with which it was preset.

When the counter 31 returns to zero, it causes the register 32 to be loaded with the code word corresponding to the state of the divide-by-27 counter 29 and the length of this word to be preset in the counter 31. The register 32 then delivers the new code word at the rate Hm while the counter 31 counts down from its new initial values. Further, the passage through 0 of the counter 31 simultaneously causes the divide-by-27 counter 29 to be reset to zero (after a short delay to avoid taking chances, the delay being provided by two inverters, not shown, connected in series with the reset to zero input of the counter 29, for example), thereby resetting the switching circuit 27 to the outputs of the divide-by-64 counter 28, whose state is thus applied to the set of combinatorial logic circuits 26 and to the auxiliary set 26'. Since the AND gate 24 remains closed, no pulse appears at the output of the AND gate 33.

When the counter 31 again passes through zero, the code word corresponding to the state of the divide-by-64 counter 28 is loaded into the register 32 while the counter 31 is set to the length of this new word. Further, the simultaneous zero state of the counters 31 and 29 opens the AND gate 33, thereby setting the divide-by-64 counter 28 to zero and activating, i.e. setting to 1, the bistable 25. The coder clock at rate HC is unblocked. The data DA is again read at the rate HC from the memory 10 and a new run is measured. The register 32 is read at the rate Hm while the counter 31 returns to zero to enable a new word to be received in the output register 32. When the counter 34 arrives at 1728, the pulse ALA which it then generates closes the AND gate 24 by means of the blocking bistable 25 and thereby interrupts the clock signal of the coder at the rate HC. The counter circuit 22 then contains the length of the last run of the scan line being processed. The arrival of the counter 24 at state 1728, which also causes the bistable 12 to take up the 1 state and causes logic level 0 to appear at the output memory 10 by resetting the bistable 13 to the 0 state, takes place while the register 32 is shifting out the end code word for the penultimate run of the scan line in question. While the end code word for the last run is being loaded into the register 32, and while the length of this word is being stored in the counter 31, i.e. when the counter 31 returns to zero after shifting out the end code of the penultimate run or, as the case may be, the composition code of the last run, the pulse delivered by the AND gate 33 passes via the AND gate 14 and initialises the colour bistable 21 to the 1 state, and ceases maintaining a forced 0 at the output of the memory 10 by setting the bistable 13 to the 1 state and sets the bistable 15 to the 1 state.

If the first data DA from the following scan line is a 1 (black point) putting the bistable 13 in the 1 state causes the output of the memory 10 to change state; the blocking bistable 25, after being put into the 1 state by the pulse at the output of the AND gate 33, is immediately reset to the zero state by the transition detector 20 which also sets the colour bistable 21 to the zero state; the counter 28 which is also reset to zero by the same pulse, remains at zero as does the counter 29. The set of logic circuits 26 thus encodes a white run of zero length. If the first data DA of the following scan line is zero (a white point), putting the bistable 23 into the 1 state does not cause the output of the memory 10 to change state; the coder will then process the first run of this new line.

Meanwhile, the register 32 is shifting out the end code word of the last run of the preceding scan line at the rate Hm and the counter 31 is counting down the same rate. When the counter 31 reaches zero, the first code word for the new scan line is loaded into the register 32 and the length of this first word is stored in the counter 31 while the AND gate 16 delivers a control pulse to the generator 17. The generator 17 then shifts out the synchronizing word at the rate Hm while preventing, by means of the gate 9, the register 32 and the counter 31 from changing state and while inhibiting, via gate 9', the output of the register 32. After the synchronising word has been sent, the generator 17 releases gates 9 and 9', the register 32 shifts out at the rate Hm, while the counter 31 returns to zero to enable a new word to be received in the output register 32.

The data DE is thus transmitted at a regular rate Hm. The rate HC (5 MHz with interruptions between runs) makes it possible for the data DE to be transmitted at a regular rate of Hm equals 2,400 bits per second.

With the above values for the rates HC et Hm, the run lengths are measured during the time that separates two clock pulses of the modulator. Nonetheless, it would be possible using the coder of FIG. 2 for the run lengths to be measured over two periods of the modulator clock signal since the shortest code word in the chosen code is two bits long.

Figure 3:
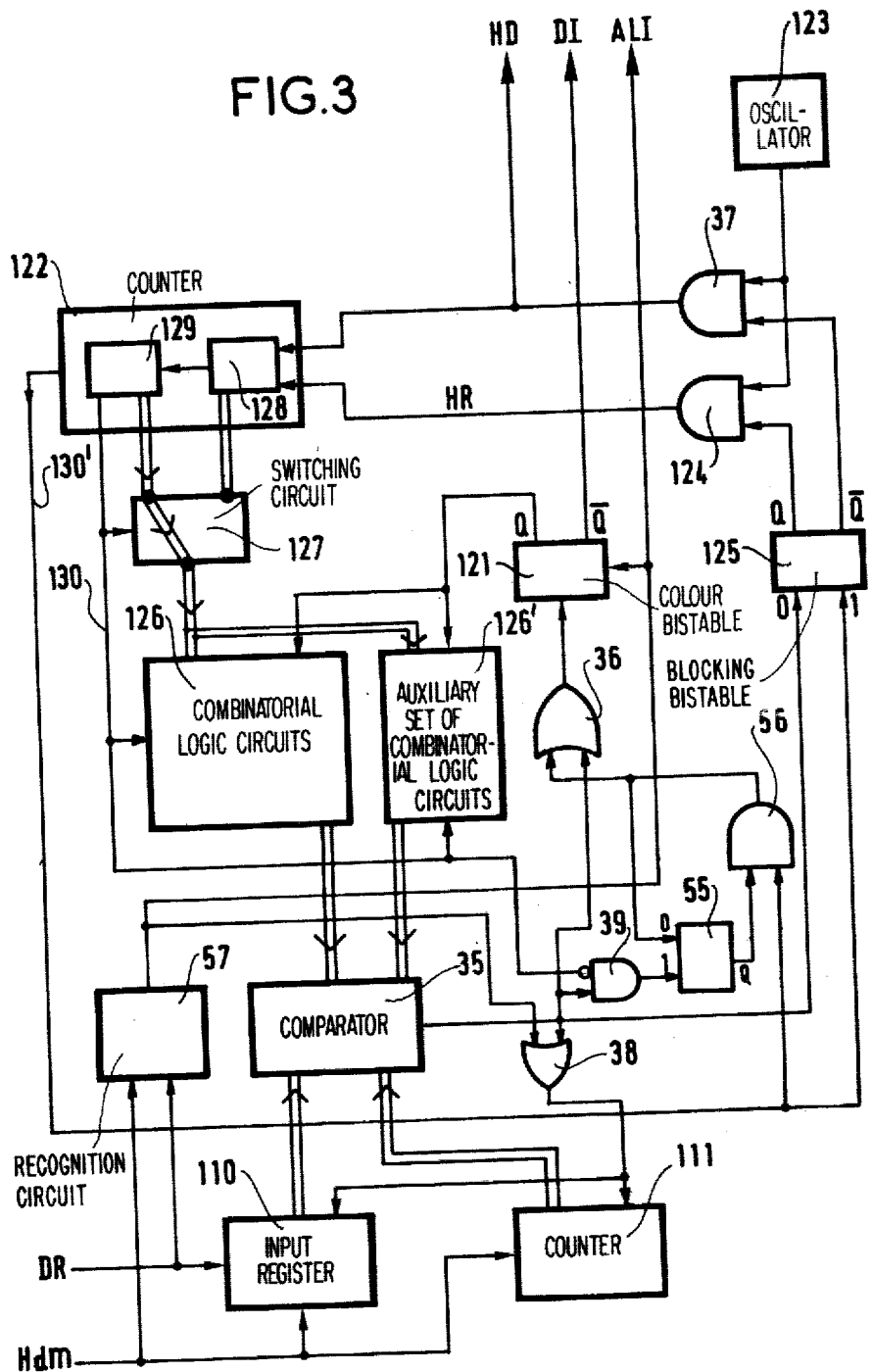

FIG. 3 shows a decoder based on the coder of FIG. 2 along the lines of FIG. 1. In order to underline the analogy between the circuit of FIG. 2 and the circuit of FIG. 3, the components in FIG. 3 which are comparable or identical to those of FIG. 2 are designated by references having the same tens and units digits to those used in FIG. 2.

The decoder forms part of a receiving equipment for facsimile signals transmitted from a transmitter equipment using a coder analagous to the coder described above. In addition to the decoder, the receiving equipment, not shown, includes a demodulator, delivering a clock signal Hdm at the rate of received data DR for decoding and a printer circuit for reproducing the document at the scan rate of the successive lines on the basis of print data DI itself as derived from the decoded data DR.

The decoder in FIG. 3 includes an input register 110 for the received data DR for decoding; this register comprises a shift register which is loaded in series by the bits constituting the data DR at the rate of the clock signal Hdm delivered by the demodulator circuit of the receiver equipment. The parallel outputs of the register 110 are connected to a first group of parallel inputs to a comparator 35. A counter 111 is associated with the register 110; it receives the clock signal Hdm at its input and its state thus defines the length of the word to be decoded as formed by the data DR contained in the register 110. The state of the counter 111 is applied to the comparator 35. The decoder further comprises a counter 122 whose counting capacity is such that its state is capable of defining the longest word of the longest possible run, i.e. 1728 in this case; it is constituted by two counters 128 and 129. The counter 128 counts through states 0 to 63 and receives a fast clock signal HR. The counter 129 counts through states 0 to 27 and records the successive passages through 0 of the counter 128 as it is counting.

The counters 128 and 129 are connected via a switching circuit 127 to a set of programmed combinatorial logic circuits 126 for coding the words received from the counters into words encoded using the truncated Huffman code chosen for the coder. The counters 128 and 129 are also connected via the switching circuit 127 to an auxiliary set of combinatorial logic circuits 126', preferably of the PLA type, and programmed to encode each word received from one or other of the counters into another word representative of the length of the corresponding code word as determined by the set 126.

A link 130 conveying a logic signal indicative of the zero state (by a logic level 1 in this case) or non-zero state (in this case by a logic level 0) of the counter 129; depending on whether the state of the counter 129 is zero or not, the switching circuit 127 connects the counter 128 or the counter 129 respectively to the set 126. The set 126 and the auxiliary set 126' also receive, via the link 130, this signal indicative of the zero or non-zero state of the counter 129. The outputs of the set 126 are applied to a second group of parallel inputs to the comparator 35 which also receives the words delivered by the auxiliary set 126'. The comparator 35 compares the two words present on its first and second groups of inputs respectively; the number of inputs in the first group which are taken into account for the comparison (starting from the least significant input) is determined by the state of the counter 111 and the number of inputs of the second group to be taken into account for the comparison (starting from the least significant input likewise) is determined by the word indicative of the length of the code word as delivered by the auxiliary set 126' (naturally, if the two lengths defined by the auxiliary set 126' and the counter 111 are different, the comparator detects non-identity). The comparator 35 delivers a logic signal, in this case level 1, when it detects identity between the two words compared and a logic signal level zero when it detects non-identity between these two words.

The fast clock signal HR is obtained from an oscillator 123 whose output is connected via an AND gate 124 to a count input of the circuit 122. The AND gate 124 is controlled by the signal at the Q output of a blocking bistable 125. The bistable 125 has a "set to zero" input connected to the output of the comparator 35: the Q output is set to zero when the comparator 35 detects identity between the words it is comparing. The bistable 125 has a "set to one" input controlled by the zero state of the counting circuit 122, this "set to one" control for the Q output of the bistable 125 is indicated by a link 130' which conveys a logic signal of level 1 or 0 according to whether the counters 128 and 129 of the circuit 122 are simultaneously in the zero state or not. The output of the comparator 35 is also connected to the counter 111 and to the input register 110 to reset them to zero each time it detects identity; this control is via an OR gate 38 which also receives a signal to be defined below.

The decoder also includes a bistable, known as the colour bistable 121, which is controlled via an OR gate 36, firstly by the output signal from the comparator 35; to change its state; each identity is detected between the two words compared by the comparator, i.e. at the end of decoding each composition code word or end code word received, and secondly by another signal explained below for changing its state a second time following the decoding of each received composition code word, before decoding the end code word is complete. The Q output of the bistable 121 is connected to one input of the set 126 and also to one input of the auxiliary set 126'; it supplies these sets with data concerning the colour of the corresponding run during the decoding operation for each received code word. The signal at the $\overline{Q}$ output of this bistable which alternates between levels 1 and 0, defines printing data DI in association with the decoder clock signal HD. The signal HD is obtained from the oscillator 123 at the output of an AND gate 37. The AND gate 37 is connected to the oscillator and is controlled by the $\overline{Q}$ output of the bistable 125. The AND gate 37 is opened by the $\overline{Q}$ output being at level 1 each time identity is detected between the two words compared by the comparator 35. The output of the AND gate 37 is connected to a count down input of the counting circuit 122. When the counters 128 and 129 are at zero, the $\overline{Q}$ output of the bistable 125 goes to the zero state: the AND gate 37 is closed and the decoder clock signal HD interrupted.

It will be observed here that, to avoid any risk of the decoder clock signal HD being started when not required during the decoding of an (end) code word relating to a zero length run, the set to "zero" input of the blocking bistable 125 is provided in practice with an inhibitor circuit (not shown) controlled by an AND gate (not shown) connected both to the output of the comparator 35 and to the link 130', in order to inhibit any set to zero instruction applied to the bistable 125 from the comparator 35 so that the counting circuit 122 is simultaneously in the zero state.

To control the colour bistable 121, the signal indicative of the zero or non-zero state of the counter 129 as transmited by the length 130 is applied to a first input, an inverting input, of an AND gate 39 which has a second input connected to the output of the comparator 35. The output of the gate 39 is connected to "set to one" input of a bistable 55 to set that bistable to the one state each time that the comparator 35 detects identity while the counter 129 is not at zero. The Q-output of the bistable 55 is connected to an AND gate 56 which is also connected to the link 130' that conveys the signal indicative of zero or non-zero state of the counter circuit 122. The output of the AND gate 56 is connected to the reset to zero input of the bistable 55 to reset this bistable to zero each time that the counter circuit 122 arrives at the zero state while the bistable 55 is in the one state. The output signal from the AND gate 56 is applied to the colour bistable 121 via an OR gate 36 to change the state of this bistable at the first return to zero of the counter circuit 122 after each detection of identity by the comparator 35 and providing that the state of the counter 129 is not simultaneously zero i.e. at the end of transmission to the print circuit of each string of data DI corresponding to a composition code word.

Further, the colour bistable is initialized at the beginning of each print line, i.e. it is set into a defined state in order to begin each line by processing a code word relating to a run of a defined colour, i.e. white in the present example. The bistable 121 is initialized under the control of a binary word recognition circuit 57 which receives the data DR and the clock rate signal Hdm and is arranged to recognise the line synchronizing word in the data DR. On recognition, the circuit 57 delivers a pulse called the print line feed instruction ALI which is delivered to the print circuit to cause it to change print lines and, also, to force the colour bistable 121 into a given state, in this case zero, representatives of the said defined colour. This pulse ALI also resets the counter 111 to zero and the input register 110 to zero both by means of an OR gate 38.

In operation, the counter circuit 122 counts fast clock pulses HR delivered by the AND gate 124. The code words coming from the set 126 representative of the successive states of the counters 128 and 129 after coding, are compared with the word defined by the data DR contained in the register 110. When the comparator detects identity between the words it is comparing, the contents of the counter circuit 122 indicate the run length corresponding to the code word then present in the input register. The colour bistable 121 changes state so that the level at its output $\overline{Q}$ then defines the colour of the run corresponding to the code word. If the switching circuit 127 is positioned on the outputs of the counter 129 when identity is detected, the word contained in the input register is a composition code word. It will therefore be followed by an end code word relating to a run of the same colour. After the bistable 121 had changed state, the colour data applied by this bistable (via its Q output) to the set 126 and 126' indicates a different colour. During such detection, the bistable 55 is set to one in order to cause the colour bistable 121 to change state again before the end word is decoded. If the switching circuit 127 is connected to the outputs of the counter 128 when identity is detected, the word contained in the input register is an end code word and the bistable 55 remains in the zero state. Regardless of whether a composition code word or an end code word (relating to an non-zero run length) is being decoded, the comparator ensures at each detected identity that the fast pulses HR counted by the circuit 122 are interrupted and the decoder clock signal HD is enabled for writing print data DI at the rate HD. The contents of the circuit 122 is then decremented and it counts down until it is zero; when the circuit 122 regains the zero state, the bistable 125 has its Q output set to one and the colour bistable 121 only changes state if the bistable 55 is simultaneously in the one state. Each time the comparator 35 detects an identity, the counter 111 is also reset to zero in order to make another measurement of the length of the new word to be decoded defined in the following data DR; likewise the input register 110 is reset to zero.

The state of the counter circuit 122 runs through all possible values during the interval of time where it stands between two pulses at the rate Hdm (the rate Hdm is 2400 bits per second while the fast clock signal is at 5 MHz). If no identity is detected by the comparator 35 a new data bit DR is received in the register 110 and is counted in the associated counter 111. As soon as an identity is detected by the comparator, the counter circuit 122 counts down to zero in order to define the data DI. The length of time required for the operations both of decoding a received code word and then sending corresponding print data DI to the printer circuit is always less than two periods of the Hdm clock signal in this case, thereby making it possible to perform both of these operations for each received code word before the end of the reception of the following code word in the present example where the chosen code's shortest word is two bits long. Naturally, slight modifications to the circuit illustrated, in particular, adding supplementary registers, would make it possible to store the state of the counters 128 and 129, in particular adding supplementary registers, would make it possible to store the state of the counters 128 and 129 and to deliver data DI while receiving and decoding the following coded word from the data DR.

Figure 4:
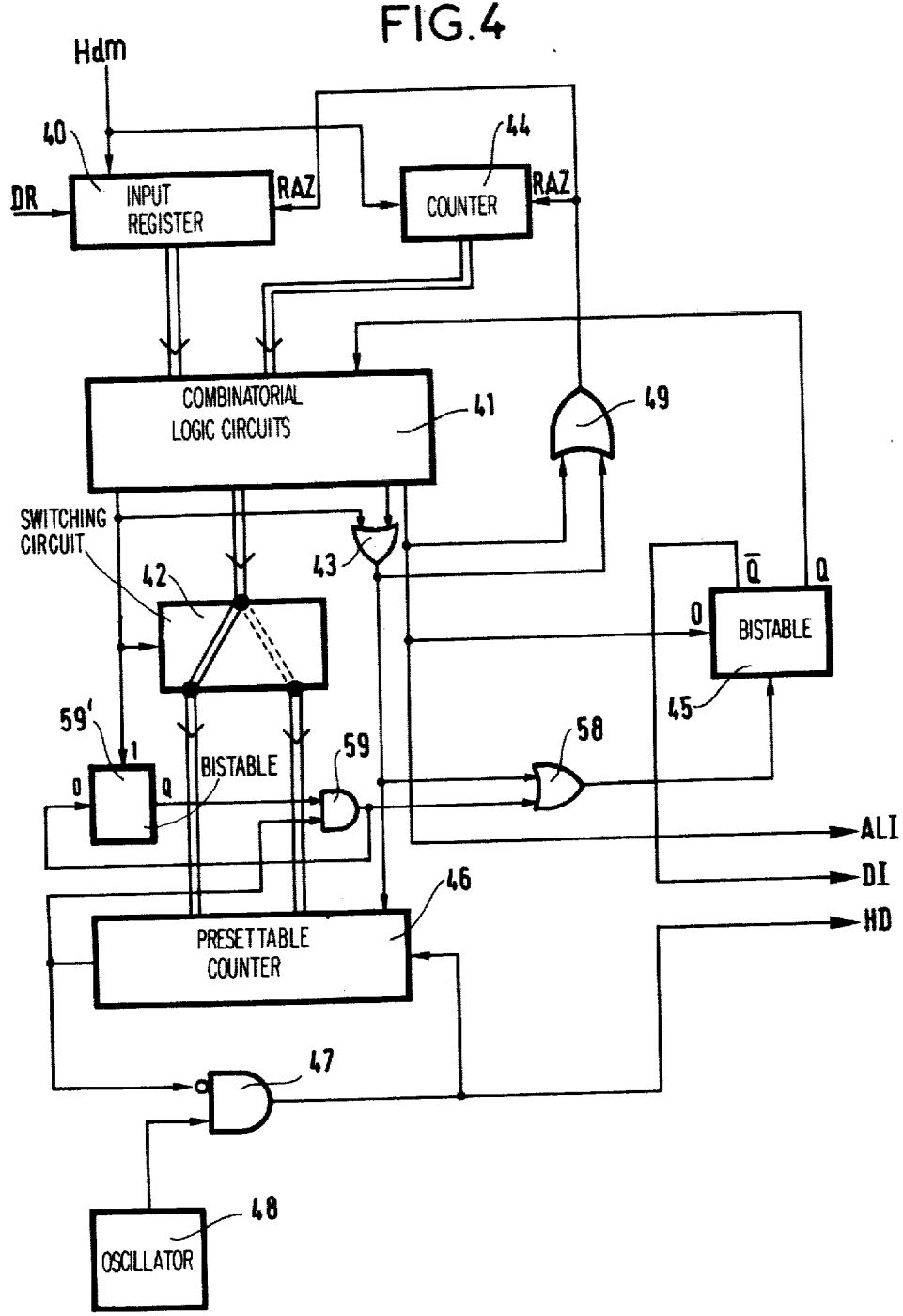
FIG. 4 is a schematic circuit diagram which shows a decoder and FIG. 5 shows a coder implemented in accordance with the invention on the basis of the decoder circuit of FIG. 4.
Figure 5:
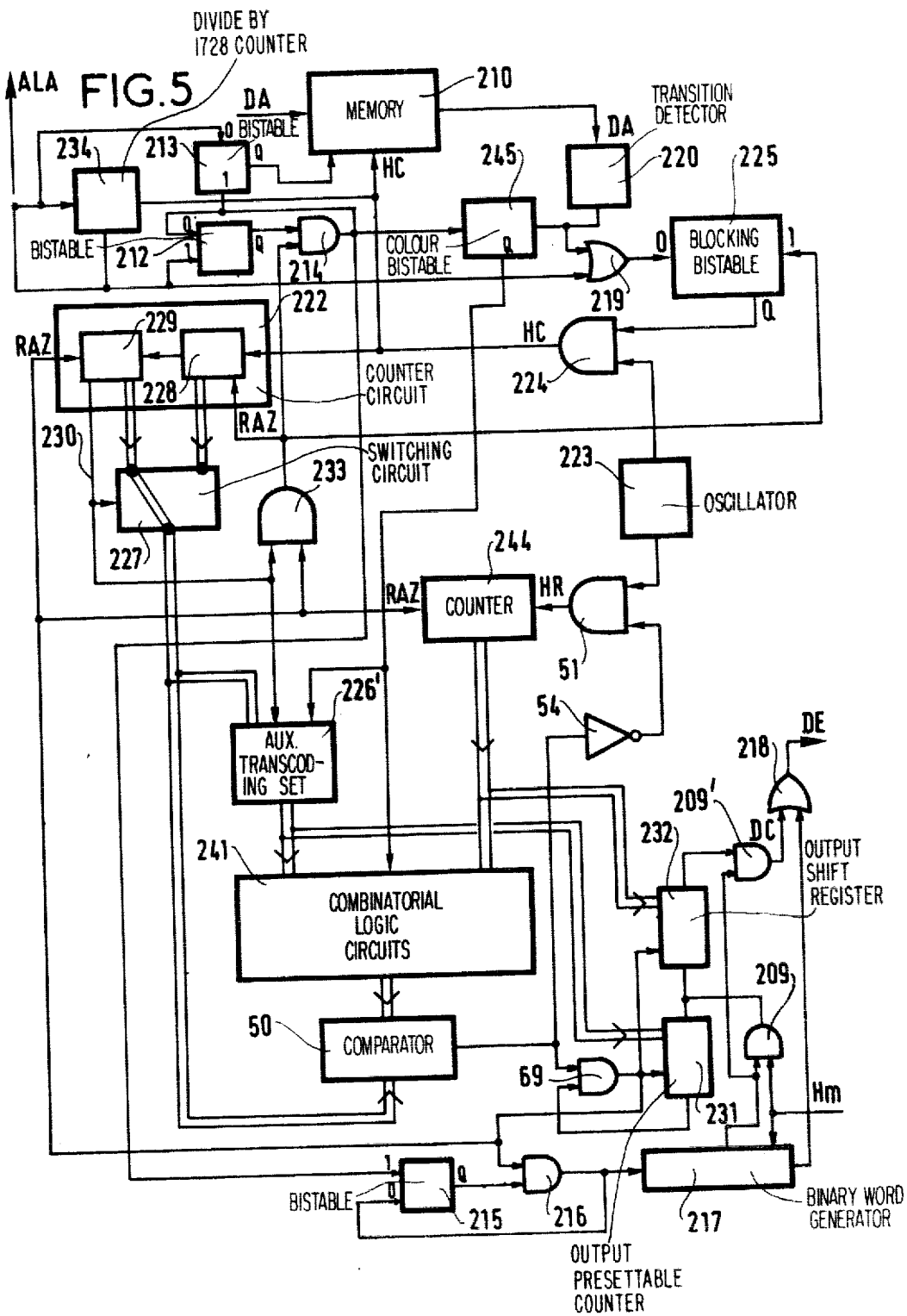

FIGS. 4 and 5 show a variant with respect to FIGS. 2 and 3, of a decoder having a transcoding circuit programmed for decoding received code words and a coder having a transcoding circuit constituted by that of the decoder. As in FIGS. 2 and 3, the decoder and the coder are associated respectively with a device receiving the print data DI or a scan device providing the scan data DA, and with a demodulator or a modulator providing a clock signal Hdm at the rate of the received data DR or a clock signal Hm at the rate of the transmitted data DE.

The decoder in FIG. 4 receives data DR at its input at the rate Hdm of the associated demodulator clock (not shown). It includes an input register 40 which receives the data DR in series at the rate Hdm, and constituted by a shift register which is shifted at the rate Hdm. The register 40 has parallel outputs connected to parallel inputs of a set of combinatorial logic circuits 41 of the PLA type, programmed to recognize the words received from the register 40 and to transcode them into corresponding run length words. Thus, with reference to tables I and II above, the set 41 recognizes end code words and composition code words that it receives and delivers via a group of outputs in parallel corresponding run length words for runs of less than 64 bits or run length words for runs in multiples of 64 bits. The set 41 also delivers, via a first supplementary output, a signal indicating recognition or non-recognition of an end code word (by a logic level 1 or 0), and via a second supplementary output, a signal indicating recognition or non-recognition of a composition code word (by a logic level 1 or 0).

A counter 44 receives the clock rate signal Hdm and is associated with the register 40. Its outputs are connected to a second group of parallel inputs to the set 41. The counter determines the length of the code word present in the register 40 and supplies this data to the set 41 which, in consequence, enables only those of its inputs which are connected to the appropriate outputs from the register 40.

The decoder further includes a presettable counter 46 whose maximum state is equal to the number of points along a scan line or a print line (1728 in this case). This counter has parallel inputs for receiving the number to which is to be preset, with the least significant parallel inputs 0 to 6 constituting a first group and the more significant parallel inputs from 7 upwards constituting a second group. A switching circuit 42 connects the parallel outputs of the set 41 which supply the run length words to the first or to the second group of parallel inputs of the counter 46. The switching circuit 42 is controlled by the signal at the second supplementary output from the set 41: if the set recognizes a composition code word, the switching circuit 42 is positioned on the second group of parallel inputs to the counter 46 and if it recognizes an end code word, the switching circuit is positioned on the first group of parallel inputs to the counter 46, while in either case the remaining parallel inputs to the counter 46 are set to 0. The counter 46 has a load-enable input connected to the output of an OR gate 43 which receives a signal from the first supplementary output of the set 41 and also a signal from the second supplementary output therefrom: the counter 46 thus receives a load-enable instruction for each code word recognized by the set 41 whether it is an end code or a compositin code word. In response thereto it stores the corresponding run length word as delivered by the set. If the code word is a composition code word, the counter 46 receives the corresponding run length word via the switching circuit 42 on its more significant parallel inputs, and if the code word is an end code word it receives the corresponding run length word on its less significant parallel inputs. In both cases the remaining parallel inputs receive 0. The counter 46 is thus present to the run length corresponding to the recognized and decoded code word.

The output signal from the OR gate 43, which is applied to the load-enable input of the counter 46, is also applied, via an OR gate 49, which further receives a signal described below, to the counter 44 and to the input register 40 to reset them to 0 (RAZ) after each code word has been recognized.

The counter 46, is also connected, via an AND gate 47, to an oscillator 48 having a frequency of 5 MHz for a clock rate Hdm of 4800 bits/s. The AND gate 47 has an inverted input which is connected to an output of the counter 46 in such a manner as to open the gate 47 when the counter 46 is in the non-zero state. The signal delivered by the AND gate 47 constitutes the HD clock rate signal of the decoder, which, when applied to the presettable counter 46, causes it to count down to zero.

The output signal from the OR gate 43, as applied to the load-enable input of the presettable counter 46, is also applied, via an OR gate 58, to a bistable 45 which changes state each time the counter 46 receives a load-enable signal, and thus constitutes a colour bistable. The bistable 45 also changes state under the control of a different signal received via the OR gate 58, whenever the counter 46 returns to zero after being preset to a run length corresponding to a decoded composition code word. This different signal is delivered by an AND gate 59 which has one input connected to the Q output of a bistable 59' and another input connected to the output of the counter 46. The bistable 59' has a "set to one" input connected via a delay circuit (not shown and constituted, for example, by two inverters connected in series) to the second supplementary output of the set 41. The "reset to zero" input of the bistable 59' is connected to the output of the AND gate 59. The bistable 59' is set to 1 each time that the set 41 recognises a new composition code word, but after a short delay to ensure that the counter 46 then being loaded is no longer at zero. The bistable 59' is reset to zero when the counter 46 returns to zero after counting down from the run lengths corresponding to the decoded and recognized composition code word. The Q output of the bistable 45 is connected to an input of the set 41 to indicate the colour of the run length corresponding to the word to be decoded. The colour bistable 45 is also reset to zero on a signal applied thereto by the set 41 when the set 41 recognizes a synchronisation word in the data DR. This same signal is also applied via the OR gate 49 to the counter 44 and to the register 40 to reset them to zero, and further constitutes the signal for advancing one scan line ALI as applied to the printer.

The decoded data DI is taken from the $\overline{Q}$ output of the colour bistable 45 and changes state at the rate HD.

In operation, the colour bistable 45 is put into the zero state at the beginning of each printing scan line by the signal ALI. The colour bistable is thus systematically initialised to enable decoding of a code word relating to a run length of a predetermined colour (a white run). The set of combinatorial-logic circuits 41 receives this colour data at the beginning of the line together with the contents of the register 40 in order to recognize the successive code words and to decode them.

The register 40, which is initially at zero, receives data DR at the rate Hdm. The counter 44 is also intially at zero and its state indicates the number of bits in the data DR received by the register 40. At all times, the data DR loaded into the register 40 is applied to the set 41, while at the same time the state of the counter 44 is also applied thereto, indicating the number of bits received in the register and consequently enabling the corresponding inputs to the set 41. Thus, for example, if a four-bit code word is received in the register 40, this word is accompanied in the register 40 by a series of zeros which will be ignored by the set 41 because the state of the counter 44 is at four and thus ensures that only the four least significant inputs of the set 41 are enabled.

When a code word is decoded, the corresponding run length expressed in binary form is loaded into the counter 46 and the colour bistable 45 changes state. If the word is a composition code word, the bistable 59' is set to 1, while if the word is and end code word the bistable 59' remains in the zero state. In both cases, the counter 46 starts counting down at the rate of the signal HD which is applied thereto after loading, except, that is, in the event of an zero length run being preset. The decoder supplies print data DI deduced from the decoded code word and constituted by the $\overline{Q}$ output signal from the colour bistable 45 to the printer in association with the clock signal HD. When the counter 46 returns to zero, the clock signal HD is interrupted. If the word which has just been decoded is a composition code word, such a "return to zero" of the counter 46 also causes a second change of state of the colour bistable 45 by means of the bistable 59'. The colour bistable 45 thus continues to apply the sme colour data via its Q output to the set 41 as it was applying during processing of the composition code word, thereby ensuring proper processing of the end code word which follows the composition code word to make up its length. If the word which has just been decoded is an end code word, the next code word to be received will concern a new run (i.e; of a different colour); in this case, the counter 46 returning to zero does not cause a second change in the state of the colour bistable 45.

FIG. 5 shows a coder based on the decoder of FIG. 4 in accordance with the circuit shown in FIG. 1. In FIG. 5, some of the circuits have the same function as circuits appearing in FIGS. 2,3 and 4, and are therefore designated therein by references whose tens and units digits are the same. Likewise this coder is considered to be receiving scan data DA at a coder clock rate HC, to be determining coded data DC therefrom, and to be delivering transmit data DE for transmission to a modulator (not shown) at a modulator clock rate Hm, the transmit data DE being constituted by the coded data DC corresponding to succesive scan lines, the scan lines being separated from one another by a predetermined word i.e. a line synchronization word.

The coder includes a transition detector 220 receiving at its input the scan data DA from a memory 210 at a coder clock rate HC, and delivering a signal indicative of changes in the scanned run. The transition detector 220 is connected to a colour bistable 245, whose Q output provides data concerning the colour of successive scan runs. A counter circuit 222 whose counting capacity is chosen to be equal to the number of points along a scan line receives the coder clock signal HC. In this case the counter circuit has a capacity of 1728 and is constituted by two counters; a first one of these counters 228 receives the signal HC and counts through state 0 to 63, while the other counter 229 detects the successive passages through zero of the counter 228, and the state of the second counter 229 can count up to 27. The counter circuit 222 is connected to an oscillator 223 via an AND gate 224 which supplies the coder clock signal HC. The AND gate 224 is opened by the Q output signal from a blocking bistable 225. The output of the detector 220 is connected, via an OR gate 219, to a "reset to zero" input of the blocking bistable 225, to reset its Q output to zero at each transition detected by the detector 220. The bistable is set to one by a signal described below. The signal HC is thus delivered by the oscillator 223 during periods for which the Q output of the blocking bistable 225 is at level 1. The signal HC supplies the clock rate of the scan data DA taken from the memory 210, and serves to measure the length of each scan run by means of the counter circuit 22, the colour of the measured run being given by the Q output of the bistable 245.

The measured run length word contained in the circuit 222 is formed of one word contained in the counter 229, corresponding to a multiple of 64, and one word contained in the counter 228 and not exceeding 63.

A controlled switching circuit 227 connects the parallel output of one or other of the counters 228 and 229 to a first group of parallel inputs of a comparator 50. The switching circuit is controlled by an output signal from the counter 229 indicated by a connection 230. When the counter 229 is not in the zero state the switching circuit applies the contents of the counter 229 to the comparator, while when the counter 229 is in the zero state, it is the contents of the counter 228 which is applied to the comparator. The coder includes a set of combinatorial-logic circuits 241, identical to the set 41 (FIG. 4) and of the PLA type. This set of circuits is programmed to decode code words (i.e. end code words or composition code words) as applied thereto, and thus to deliver decoded words (run length words). The set 241 has parallel inputs connected to the parallel outputs of a counter 244 whose counting capacity is chosen to be able to define the longest possible code word. The counter 244 has an input connected to receive a fast clock signal HR taken from the oscillator 223 and connected to the input of the counter 244 via an AND gate 51.

The set 241 is connected to the Q output of the colour bistable 245 to receive data concerning the colour of the measured run whose lengths is to be decoded.

The set 241 is also associated with an auxiliary transcoding set 226', preferably also of the PLA type. The auxiliary set transcodes a received word into another word indicative of the length of the corresponding code word, in accordance with a coding law defined for the coder.

The auxiliary set 226' has parallel inputs connected to the parallel outputs of the circuit 227 to receive the contents of one or other of the counters 228 and 229 depending on the position of the switching circuit. It also has an input connected to the Q output of the colour bistable 245 and an input connected to the counter 229 via the connection 230. On its parallel outputs it delivers words which define the lengths of the code words corresponding to the words received from the counters 228 or 229. Thus, with reference to the tables given above, if the measured run is white and has a length 6, the contents of the counter 228 is 110 and is applied to the auxiliary set 226' together with data indictive of the colour and of the state (zero) of the counter 229. In response thereto the set 226' delivers the word 100 indicating that the required code word comprises four bits (according to table I this code word is 1110).

The outputs from the auxiliary set 226' defining the length of the required code word are applied to corresponding parallel inputs of the set 241 to supply it with length data concerning the required code word and consequently to enable sufficient inputs (starting from the least significant input) connected to the counter 244 to receive all possible code words of this length therefrom. Thus, for a required four-bit code word, only the four least significant outputs from the counter 244 and corresponding inputs to the set 241 are taken into consideration.

The parallel outputs of the set 241 are connected to a second group of parallel inputs to the comparator 50. The comparator 50 detects identity between the two words which it receives on its two groups of inputs. The output of the comparator 50 is connected via an inverter 54 to the AND gate 51 which delivers the fast clock signal HR; when there is identity between two compared words, the AND gate 51 is closed and the signal HR turned off. The output of the comparator 50 is also connected, via an AND gate 69, to the load enable input of a shift register 232, having parallel inputs connected to the outputs of the counter 244 and having its clock input connected to the clock rate signal Hm to supply serial data constituting the coded data DC. The register 232 receives the clock rate signal Hm via an AND gate 209 which is controlled by a signal that is described below to close the AND gate during transmission of a line synchronizing word. A presettable counter 231 associated with the register 232 is also enabled for loading by the comparator 50 via the AND gate 69 and receives the word delivered by the auxiliary set 226' indicating the length of the coded word. This counter receives the clock rate signal Hm via the AND gate 209 and counts down while the register 232 is shifting out. One output of the counter 231 delivers a signal indicative of the zero or non-zero state of the counter (1 and 0 respectively in this case). This signal is applied to the AND gate 69 to enable loading of the output register 232 and of the output counter 231 each time that the comparator 50 detects identity simultaneously with the counter 231 being in the zero state. The AND gate 69 thus delivers a series of short 1-pulses instructing the counter 231 and the register 232 to load. These pulses are also applied to reset the counter 229 to zero, to reset the counter 244 to zero and to one input of an AND gate 233. The AND gate 233 is open when the counter 229 is in the zero state as indicated by the connexion 230. Each pulse transmitted by the AND gate 233 is thus indicative of an end code word in the register 232, and resets the counter 228 to zero and sets the Q output of the blocking bistable 225 to 1.

A divide-by-1728 counter 234 for the 1728 points along a scan line (in this case) receives the coder clock signal HC. Each time this counter passes through 1728, it delivers a scan line feed pulse ALA which is transmitted to the document scanner (not shown) associated with the coder and which is also applied to reset the counter 234 to zero. In the coder, the output of the counter 234 which delivers the pulses ALA at level 1, for example, is connected to the blocking bistable 225 via an OR gate 219 to reset this bistable to zero (i.e. to put its Q output to zero) each time there is an ALA pulse. Each time the counter 234 arrives at 1728, it thereby closes the AND gate 224.

The pulses ALA are also used in the coder for each string of scan data DA corresponding to one scan line to initialize the logic level at the output of the memory 210 to a given value and to put the colour bistable 245 into a given state so that the first run processed at the beginning of a line is systematically of a given colour (e.g. white and if, in fact, the first scan run is black, then the coder will begin by processing an initial by white run of zero length). The pulses ALA are further used to cause a line synchronizing word to be added to each string of coded data DC corresponding to one scanned line.

For these purposes, the output of the counter 234 is connected to a "set to one" input of a first bistable 212 and to a "reset to zero" input of a second bistable 213 to set and reset these bistables respectively each time the counter 234 arrives at 1728. The signal on the Q output of the bistable 212 is applied to control an AND gate 214 which also receives pulses delivered by the AND gate 233. The output of the AND gate 214 is connected to the "reset to zero" input of the bistable 212: the AND gate 214 thus passes only the first pulse delivered by the AND gate 233 after each arrival of the counter 234 at 1728. The pulses passed by the AND gate 214 are applied to the colour bistable 245 to put it into a given state, one in the present example, and to the bistable 213 to set it to the one state. The signal at the Q output of the bistable 213 is applied to a supplementary input to the memory 210 to force the given logic level at the output of the memory 210, a zero level in the present case, whenever it is itself at the zero level. That is to say during the time interval which separates each arrival of the counter 245 at 1728 from the first load instruction to the counter 231 and the register 232 which appears thereafter and provided that the counter 229 is in the zero state. For this purpose, an AND gate (not shown) is placed at the output of the memory 210 and is controlled by the output signal from the bistable 213 as applied to the said supplementary input. The output of the AND gate 214 is further connected to the "set to one" input of a bistable 215 to set it to the one-state each time a pulse is delivered by the AND gate 214. The signal at the output of the bistable 215 controls an AND gate 216 which is also connected to the output of the AND gate 69 which delivers load instruction pulses to the counter 231 and the register 232. The AND gate 216 is connected to a "reset to zero" input of the bistable 215. The AND gate 216 only passes the first pulse delivered by the AND gate 69 after each pulse passed by the AND gate 214. The output of the AND gate 216 is connected to a control input of a binary word generator 217 which delivers the line synchronizing word. The generator 217 receives the modulator clock rate signal Hm on another input. In response to each pulse received from the AND gate 216, the generator 217 serially delivers the bits of the line synchronizing word at the rate Hm. The line synchronizing word, may, for example, be constituted by eleven successive zeros followed by one. On an auxiliary output the generator delivers a signal which causes the AND gate 209 to be closed while the line synchronizing word is being generated. It is via the AND gate 209 that the clock rate signal Hm is applied to the output register 232 and to the presettable counter 231.

The signal on the auxiliary output of the generator 217 is applied to a further AND gate 209' which is also connected to the output of the register 232 to fix the logic level at the output of the AND gate 209' to zero while the line synchronizing word is being generated.

An OR gate 218 having a first input connected to the generator 217 to receive the synchronizing word and a second input connected via the AND gate 209' to the output register 232 to receive the data DC delivers data DE which is applied to a modulator for transmission to line, after being re-sampled in a re-sampling bistable (not shown) clocked by the signal Hm.

In operation of the coder when processing a scan line, i.e. while the counter 234 has not arrived at 1728, and when a run of colour determined by the Q output of the bistable 245 has been measured by the circuit 222, the contents of the counter 229 (supposing it to be non-zero) is applied to the comparator. Simultaneously, the auxiliary set 226' defines the length of the required code word and applies that length to the set 241 which selects the corresponding outputs of the counter 244. Likewise simultaneously, the counter 244 receives the fast clock signal HR from the oscillator via the AND gate 51 which is kept open by the non-identity signal from the comparator 50. As the counter counts taking successive possible values, the set 241 delivers decoded words corresponding to the respective words which it receives from the selected outputs of the counter 244. On identity between two words received by the counter 50, the AND gate 51 is closed and the signal HR stopped. During this time, the register 232 previously loaded with the end code word of the previously processed run, is shifting data out via the open AND gate 209' at the rate Hm as received by the open AND gate 209 while the counter 231 previously preset to the length of the code word in question is counting down at the same rate.

When the counter 231 returns to zero it causes the contents of the counter 244 to be loaded into the register 232 by applying a signal via the AND gate 69 which is then open. Likewise the word given by the auxiliary set 226' is loaded into the counter 231 to indicate the length of the code word. The data is then shifted out of the register 232 at the rate Hm while the counter 231 counts down from its new initial value. Further, the counter 231 returning to zero resets the counter 244 to zero to begin seeking a new code word. The return of the counter 231 to zero also causes the counter 229 to be reset to zero and, provided they were already at zero, resets the counter 228 to zero and releases the bistable 225: this is done via the AND gate 224 which is then opened so that a new run can be measured. The return of the counter 231 to zero only resets the counter 229 to zero if its state is not already zero, the AND gate 233 remaining closed. The contents of the counter 228 are then processed in the same manner as that of the counter 229 by seeking the words defined by the state of the counter 244, then counting, which corresponds to the required code word.

The counter 234 arrives at 1728 while the register 232 is transmitting the end code word for the penultimate run of the scan line in question. The pulse ALA delivered by the counter 234 then blocks the blocking bistable 225 and forces a zero at the output of the memory 210. This pulse is also stored by the bistable 212 to initialize the colour bistable 245 (to zero) and to remove the forced zero from the output of the memory 210 and the moment when the register 232 receives the instruction to load the end code word for the last run and the length of this word is loaded into the counter 231. When the instruction is given to load the following code word into the register 232, i.e. a word relating to the next scan line, the generator 217 receives a control pulse from the open AND gate 216 and in response it sends the synchronizing word via the OR gate 218 at the rate Hm while the AND gates 209 and 209' remain closed. After the synchronizing word has been sent, the generator 217 opens the AND gates 209 and 209' to enable successive code words of the next scan line to be sent.

In practical embodiments of a coder and a decoder such as shown in FIGS. 2 and 3 or FIGS. 4 and 5, the capacity of the registers and the counters receiving the code words can be limited. The registers are advantageously limited to a length of eight bits and the word length counters to four bits; this relies on the fact that, although the lengths of the code words given in the tables I and II vary between two and thirteen-bits, all code words of length greater than eight bits begin with a string of zero bits. It is thus possible to define all the code words by one significant eight-bit byte with the real length of the code word being given independently by a four-bit word.

Thus, with reference to FIGS. 2 to 5, the output register 32, the input register 110, the input register 40, and the output register 232 can all be eight-bits long. The counters associated with these registers, i.e. the counter 31, the counter 111, the counter 44 and the counter 231, define the lengths of the code words on four bits. In such a case, supposing that the registers are to contain the code word corresponding to a white run of length 14, the contents of the register will be 00110100, while the contents of the associated counter will be 0110, signifying that the code word has a length of six bits and is, in fact, 110100. Similarly, if one of the registers is to contain a code word defining a black run of length 32, the contents of the register will be 01101010 while the contents of the counter will be 1100, signifying that the code word is twelve bits long and is 000001101010.

With reference more particularly to FIG. 5, it will be observed that it is also advantageous to limit the capacity of the counter 244 to eight bits since the set 241 receives not only the state of the counter 244, but also the real length of the required code word as given by the auxiliary set 226'. This limited capacity of the counter 244 makes it possible to code run length words much faster: with the run length word to be coded being applied by the counter circuit 222 to the comparator 50, less than 256 periods of a fast clock are required to find the corresponding code word. This ensures that with a 5 MHz fast clock signal and a clock rate Hm of 4800 bits/sec. that the data DE is transmitted regularly at the rate Hm, since each run length is measured and the first, or as the case may be, the only run length word is coded for the said run in less than two periods of the clock signal Hm, i.e. always before the end of transmitting the end code word of the previous run. Clearly there is time to spare when an end code word is to be found after a composition code word has been found and transmitted. The AND gate 69 which controls loading of the register 232 and the counter 231, is thus always open when the counter 231 returns to zero at the end of transmitting a code word; its role is simply to prevent the register 232 and the counter 231 from being loaded at the wrong moment when the transmitter starts.

Figure 6:
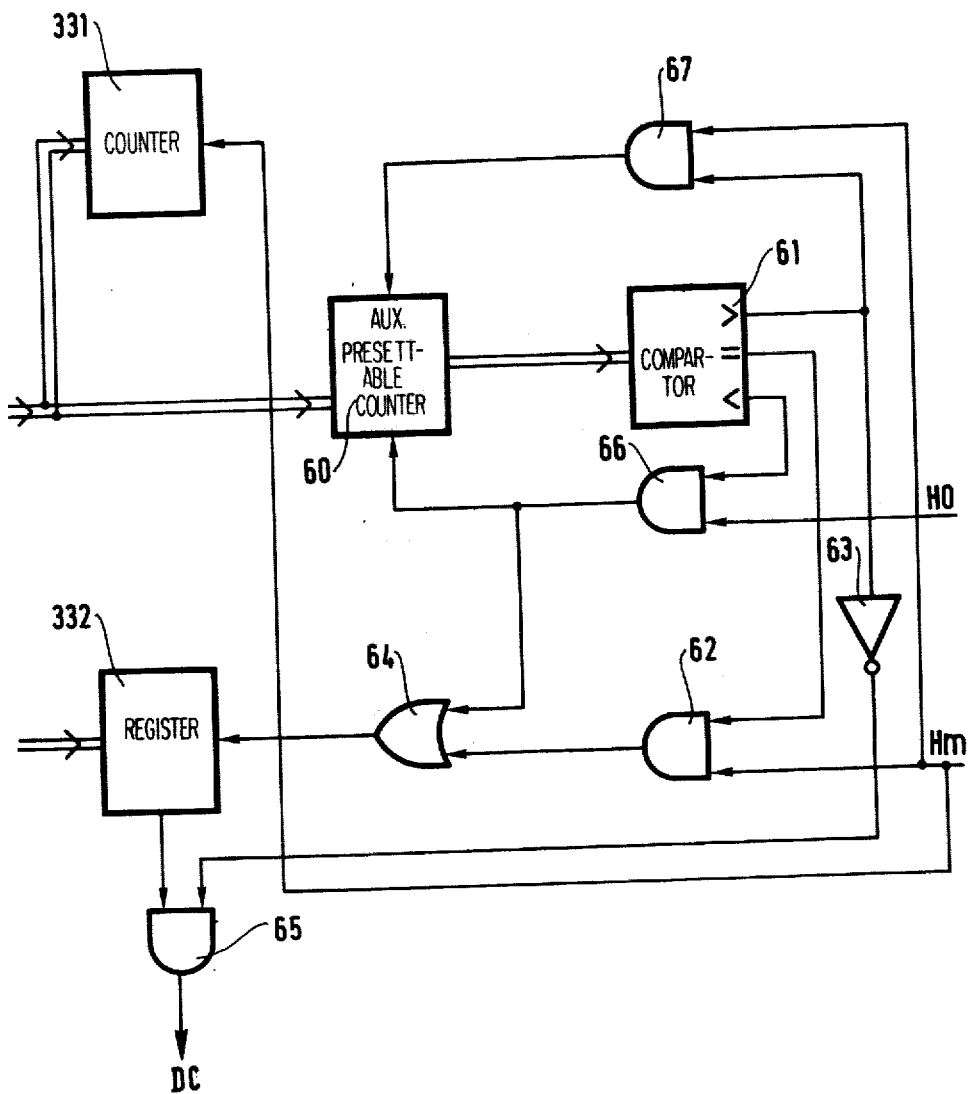
FIG. 6 is a schematic circuit diagram which shows one particular embodiment of the circuits shown in FIGS. 2 and 5.

FIG. 6 shows the arrangement of a circuit for reproducing the transmitted coded data DC. This circuit corresponds to the register 32 and counter 31 of FIG. 2 or to the register 232 and counter 231 of FIG. 5 for the case where register length is limited to eight bits and counter capacity is defined on four-bits as indicated above. For simplification, the AND gate 9 or 209 of FIG. 2 or 5 is not shown, this is the gate which delivers the clock rate signal Hm to the circuit for reproducing the coded data DC. In FIG. 6, the register is referenced 332, and the counter is referenced 331. The register 332 which receives a code word for transmission, stores this word in eight-bit form, while the associated presettable counter 331 receives the lengths of the code word. An auxiliary presettable counter 60 is associated with the counter 331 and receives the length of the code word simultaneously with the counter 331. The parallel outputs of the counter 60 are connected to a "compare with eight" comparator 61. The comparator 61 delivers a signal indicating whether the contents of the counter 60 is equal to, greater than or less than, 8. These three signals are symbolized by three outputs from the comparator, having the appropriate mathematical symbol marked thereon.

The output of the comparator 61 which indicates that the contents of the counter 60 is equal to 8, is connected to a first input of an AND gate 62 which has a second input connected to receive the clock signal at the rate Hm. The output of the AND gate 62 is connected via an OR gate 64 to the shift clock input of the register 332. An AND gate 65 is connected to the serial output of the register 332 and is controlled by the signal which indicates that the contents of the counter 60 is greater than 8, after inversion by an inverter 63 and it delivers the data DC.

The auxiliary counter 60 receives a fast clock signal Ho for counting from an oscillator not shown in this figure (oscillator 23 or 233 in FIG. 2 or 5) at a frequency of 5 MHz via an AND gate 66 which is controlled by the signal indicating that the contents of the counter 60 is less than 8 as given by the comparator 61. The output of the AND gate 66 is connected to the clock input of the counter 60. The counter 60 is also controlled for counting down by the clock signal Hm via an AND gate 67 which is controlled by the signal from the comparator 61 which indicates that the contents of the counter 61 is greater than 8. The output of AND gate 67 is connected to the count-down clock input of the counter 60.

The counter 331 is caused to count down by the signal Hm.

Finally, the register 332 also receives the fast clock signal Ho on its count-down clock input via the OR gate 64 and the AND gate 66 which is controlled by the signal indicating that the contents of the counter 60 is less than 8.

The reproduction of the data DE from the contents of the register 332 is explained below by considering successively three possible examples, i.e. where the code word whose byte is contained in the register 332 is equal, less than, or greater than, 8.

When the length of the code word is equal to 8, this length is indicated by the contents of the counter 331 and 60 both loaded with 8, and the word is completely and uniquely defined in the register 332. In this case, the output of the comparator 61 for indicating that the contents of the counter 60 is equal to 8, is put into the one-state. The gate 62 is opened for the signal Hm by the "equal-to-eight" signal while the gates 66 and 67 are closed. The signal from the gate 62 causes the register 332 to shift its data out at the rate Hm while the counter 331 counts down at the same rate. The data DC is delivered regularly at the output of the AND gate 65 which is opened by the signal from the inverter 63. The counter 60 remains in the eight state with which it was loaded. The state of the counter 60 is not modified until a new code word length is loaded therein after the counter 331 has returned to zero.

Where the code word has a length of less than 8, e.g. 6, the length is expressed by the contents of the counters 331 and 60 both loaded with 6, while the code word is contained in the register 332, but the first two bits therein are zeros which do not belong to the word (since the data DC is transmitted with the most significant bits leading). In this case, the output from the comparator 61 which indicates that the contents of the counter 60 is less than 8 is at logic level 1. This output opens the AND gate 66 to pass the signal Ho which brings the counter 60 very rapidly up to the eight state while the register 32 shifts out the first two bits stored therein. The contents of the counter 60 moves from 6 to 8, between two pulses Hm; during this time the counter 331 does not change state and the two bits delivered by the register 332 at the rate Ho are not considered by the re-sampling bistable (not shown) at the output from the coder. Once the state of the counter 60 is at 8, the AND gate 66 is closed and the AND gate 62 is opened. This causes the register 332 to continue shifting out data at the rate Hm until the counter 331 returns to zero after six pulses in the signal Hm. The coded data DC delivered at the output of the coder is thus constituted by the last six-bits contained in the register 332.

When the code word has a length greater than 8, e.g. 12, the length is expressed by the contents of the counters 331 and 60 being loaded with 12, while the code word is not entirely contained in the register 332 since four leading zero-bits ought to belong thereto. In this case, the output of the comparator 61 indicating that the contents of the counter 60 is greater than 8, is at logic level 1. The AND gate 67 is opened for the signal Hm so that the counter 60 counts down the received Hm pulses in time with the counter 331. Simultaneously, the AND gates 62 and 66 are closed preventing the register 332 from shifting its data up. The AND gate 65 is also closed causing the output of the AND gate to remain at zero which is equivalent to the leading zero-bits being transmitted at the rate Hm. When the counter 60 arrives at 8, i.e. after four Hm pulses, the contents of the counter 331 are also at 8, and a signal is delivered at the appropriate output from the comparator 61 indicating equality with 8. The AND gate 67 is then closed and the counter 60 remains at 8 while the AND gate 62 is open. The register 332 shifts its data out through the now open AND gate 65 at the rate Hm. Simultaneously, the counter 331 continues to count down the Hm pulses until it returns to zero. The data DC here constituted by four leading zeros followed by the contents of the register 332 is thus transmitted at the rate Hm.

It will be observed that the counters and the register 332 are loaded between two pulses Hm and, where appropriate, the contents of the counter 60 is made to count up to 8 by pulses Ho, while the data in the register 332 is partially shifted out likewise at the rate of the pulses Ho. In the contrary case, the contents of the counter 60 is reduced, where appropriate, to 8, by counting down at the rate Hm.

Figure 7:
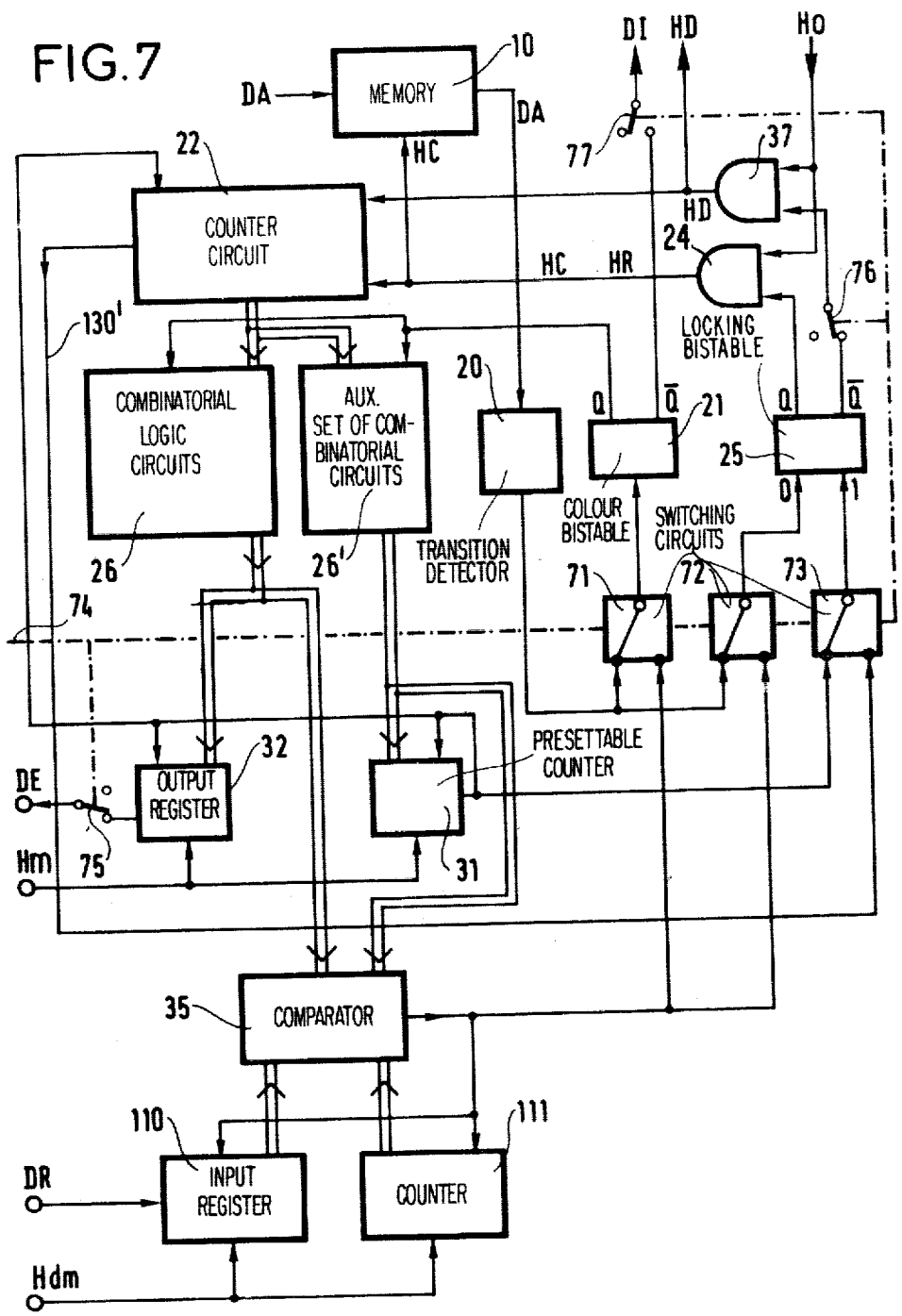
FIGS. 7 and 8 are schematic circuit diagrams which show a coder-decoder implemented in accordance with FIGS. 2 and 3 or in accordance with FIGS. 4 and 5.
Figure 8:
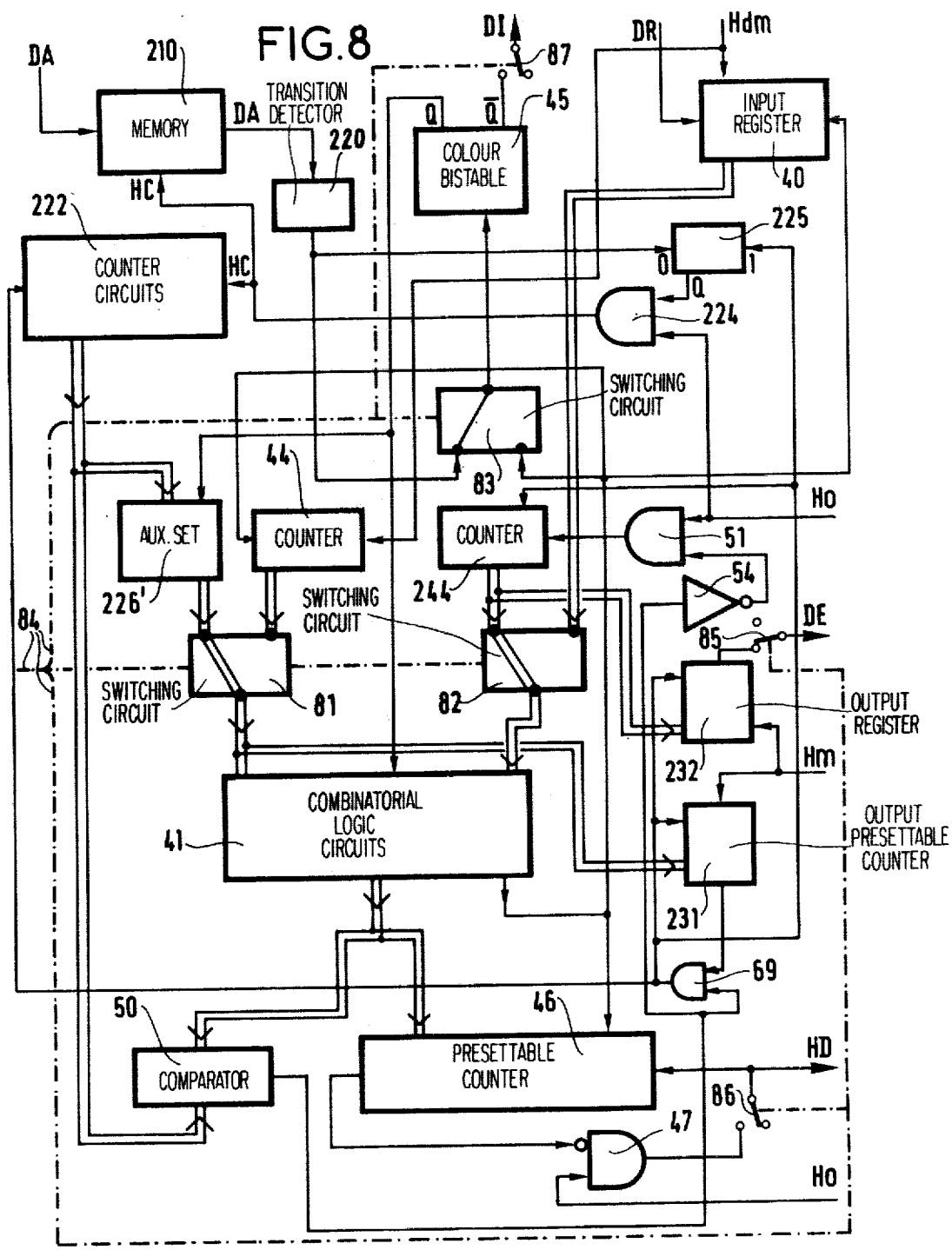

FIGS. 7 and 8 show a coder/decoder circuit implented on the basis of the circuits of FIGS. 2 and 3 or the circuits of FIGS. 4 and 5; in order not to overload these two figures, they retain the method of reproducing the data DC as indicated in FIGS. 2 to 5, even though the method shown in FIG. 6 could be used instead. Likewise, for the purpose of simplification, the run length counter circuits 22 or 222 are not shown with the two counters that make them up in practice which had lead to the logic gates and other circuits for distinguishing between composition code words and end code words, and also the instruction signals derived therefrom being omitted from these two figures. Further, still for simplification the circuits exclusively concerned with changing scan line or print line and the instructions they deliver have also been omitted. Further, the signal Ho delivered by an oscillator forming part of the equipment has been shown as an input signal thereto.

In FIG. 7 the circuits used are those from the coder of FIG. 2 and the decoder of FIG. 3 and they are not further described. Thus, the references designating the circuits used for the coding function and the decoding function of the coder-decoder are the same as those of FIG. 2, while the additional circuits used only for the coding function are designated by the references used in FIG. 2 and the additional circuits used only for the decoding functions are designated by the references used in FIG. 3.

In FIG. 7, switching circuits for selectively connecting certain circuits are simultaneously controlled, e.g. by an operator switch, depending on whether the coder/decoder is used as a coder or as a decoder. Thus, a switching circuit 71 connects the output of the transition detector 20 or the output of the comparator 35 to the control input of the colour bistable 21. A switching circuit 72 connects the output of transition detector 20 or the output of the comparator 35 to the "reset to zero" input of the locking bistable 25 while a further switching circuit 73 connects the output indicative of the zero state of the counter 31 or the output of the 130' indicative of the zero state of the counter circuit 22 to the "set to one" input of the blocking bistable. On/off switches 75, 76 and 77, each constituted, for example, by an AND gate which may be opened or closed, are controlled at the same time as the switching circuits 71 to 73. The on/off switch 75 at the output of the output register 32 prevents any data from leaving this register when the coder/decoder is operating as a decoder; the on/off switch 76 in the link between the $\bar{Q}$ output of the blocking bistable 25 and the AND gate 37 prevents any control for generating a decoder block signal HD while the coder/decoder is operating as a coder, and the on/off switch 77 placed at the $\bar{Q}$ output of the colour bistable 21 breaks the link between this bistable and the printer (not shown). Further, depending on whether the coder/decoder is operating as a coder or as a decoder, the incident clock signal Hm is present or absent and the incident clock signal Hdm is absent or present respectively. The simultaneous control of the switching circuits 71 to 73 and the on/off switches 75 to 77 is represented by a dot-dashed line 74. In FIG. 7 all the switching circuits and on/off switches are shown in the coder position of the coder/decoder.

In FIG. 8, the circuits shown are those used in the decoder of FIG. 4 and the coder of FIG. 5 and are therefore not described in greater detail. Thus, the references designating the circuits used both for coding and decoding functions are those used in FIG. 4, while the additional circuits used for decoding only are designated by the references used in FIG. 4 and the additional circuits used for coding only are designated only by the references used in FIG. 5.

With reference to FIG. 8, switching circuits for selectively connecting certain circuits together are controlled simultaneously, for example, by an operator control switch to determine whether the code/decoder is to operate as a coder or a decoder. Thus a switching circuit 81 connects the outputs of the auxiliary set 226' or the outputs of the counter 44 to the set 41 to apply data indicative of the length of the required code word or of the length of the code word to be decoded. A switching circuit 82 connects the outputs of the register 40 which receive the data DR or the outputs of the counter 244 which gives the required code word as it counts through its possible configurations to the set 41. A switching circuit 83 connects the output of its transition detector 220 or the output of the set 41 indicative of the decoding of a code word to the control input of the colour bistable 45, the level of the $\bar{Q}$ output of the bistable 45 constituting the output for data DI at the rate HD. On/off switches 85, 86, and 87, each constituted for example by an AND gate which may be opened or closed, are controlled at the same time as the switching circuits 81 to 83. The on/off switch 85, placed at the output of the output register 232 blocks all data at this output when the coder/decoder is operating as a decoder; the on/off switch 86, placed at the output of the AND gate 47 prevents a decoder clock signal HD from being used when the coder/decoder is operating as a coder, while the on/off switch 87, placed at the $\bar{Q}$ output of the colour bistable 45 prevents any connection between the said bistable and the printer (not shown) during operation as a coder. Further, depending on whether the coder/decoder is operating as a coder or as a decoder, the incident clock signal Hm is present or absent and the incident clock signal Hdm is absent or present respectively. The simultaneous control of the switching circuits 81 to 83 and of the on/off switches 85 to 87 is illustrated by a dot-dashed line 84.

In FIG. 8 all the switching circuits and on/off switches are shown in their coder position for the coder/decoder.

The present invention has been described with reference to the accompanying drawings showing various embodiments. Clearly, detail modifications may be made thereto and various means may be placed by technically equivalent means without going beyond the scope of the invention.

I claim:

1. A binary converter for converting first binary words into respective second binary words according to a defined transcoding law, the converter comprising:
   a fast clock;
   a main counter having a clock input connected to the fast clock and capable of counting so that its count state passes through all possible second binary words;
   a transcoder applying an inverse law to the defined transcoding law and connected to receive the count state of the main counter to deliver said first words successively in response to the main counter counting through said second words;
   a comparator connected to receive both said first words to be converted and said first words delivered successively by the transcoder to detect identity between simultaneously compared words; wherein the state of said main counter at the moment when identity is detected by the comparator being the second word which corresponds to said first word to be converted;
   said code converter for coding strings of same level bits into code words encoded according to a truncated Huffman code, the lengths of the strings in binary code as determined by a string length counter constituting said first words for application to said comparator and the code words constituting said second words, said code converter further including an auxiliary transcoder (226') for transcoding the length of each first word to be encoded into the length of the corresponding second word, said auxiliary transcoder having inputs directly connected to said string length counter (222) and having outputs directly connected to said transcoder (241) to enable those of its inputs which are connected to said main counter (244) that correspond to the length of the required second word.

2. A coder converter according to claim 1, further including: an output register (232,332) for each second word, said output register having parallel inputs connected to outputs from the said main counter (244); and a presettable counter (231,331) having parallel inputs connected to the outputs of the said auxiliary transcoder (226'); said output register and said presettable counter being enabled for loading simultaneously when both the output signal from the comparator (50) indicates identity between the compared words and the presettable counter is at zero; the said output register being clocked for shifting out its data at a defined clock rate Hm while the presettable counter simultaneously counts down to zero at the rate Hm; each identity detected by the comparator being maintained until the presettable counter reaches zero.

3. A coder converter according to claim 2, wherein all the code words in excess of a predetermined length are chosen such that their more significant bits in excess of the said predetermined length are all zeros, the said output register (332) being chosen to have a capacity which is limited to the said predetermined length and being arranged to store the most significant level one bit of each code word in its most significant bit position, the coder further including an auxiliary presettable counter (60) which is simultaneously loaded with the said presettable counter (331) and with the same data, an auxiliary comparator (61) arranged to make comparisons with a number indicative of said predetermined length and connected to the said auxiliary presettable counter (60) to compare the contents of the said auxiliary presettable counter (60) with said number corresponding to the said predetermined length, and logic gates (62–67) responsive to a signal from the said auxiliary comparator (61) to cause:

the said output register (332) to shift out its data simultaneously with the presettable counter (331) counting down at the rate Hm when the signal delivered by the auxiliary comparator corresponds to equality;

both the presettable counter (331) and the auxiliary presettable counter (60) to count down at the rate Hm when the signal delivered by the auxiliary comparator indicates that the contents of the said auxiliary presettable counter (60) is higher than the said number, thereby bringing the contents of the said auxiliary presettable counter (60) down to the said number while the contents of the presettable counter (331) is also counting down at the said rate Hm; and the said output register (332) to shift data out simultaneously with the said auxiliary resettable counter (60) counting up at the rate of the said fast clock signal when the signal from the auxiliary comparator indicates that the contents of the said auxiliary presettable counter (60) is lower than the said number, thereby bringing the contents of the said auxiliary presettable counter (60) up to the said number;

the rate of the said fast clock being sufficiently higher than the rate Hm for the contents of the said auxiliary presettable counter to be brought to the said number between two pulses at the rate Hm.

4. A code converter according to claim 1, 2 or 3 wherein the said transcoder (441) and the said auxiliary transcoder (226') are each constituted by a programmed set of combinatorial logic circuits.

5. A binary converter for converting first binary words into respective second binary words according to a defined transcoding law, the converter comprising:

a fast clock;

a main counter having a clock input connected to the fast clock and capable of counting so that its count state passes through all possible second binary words;

a transcoder applying an inverse law to the defined transcoding law and connected to receive the count state of the main counter to deliver said first words successively in response to the main counter counting through said second words;

a comparator connected to receive both said first words to be converted and said first words delivered successively by the transcoder to detect identity between simultaneously compared words; wherein the state of said main counter at the moment when identity is detected by the comparator being the second word which corresponds to said first word to be converted;

said converter decoding code words that are encoded using a truncated Huffman code, said code words constituting said first words in the form of data DR received at a rate Hdm, and for converting said words into binary words constituting said second words and expressing the lengths of runs of same level bits;

said converter including a colour bistable controlled by the comparator to define the level of the bit of each run of same level bits to be reproduced from the data DR;

said converter further comprising; an auxiliary transcoder (126') having inputs connected to the outputs of the said main counter to determine auxiliary words therefrom indicative of the lengths of the respective first words delivered by said transcoder (126) and to directly apply said auxiliary words on outputs connected to said comparator (35) to enable as many of the comparator inputs connected to said transcoder as are instantaneously indicated by each said auxiliary word;

a counter (111) for counting the length of the first word to be decoded at the clock rate Hdm and connected to said comparator to enable as many comparator inputs connected to receive the said first word to be decoded as indicated by the state of the counter for counting the length of the first word to be decoded.

6. A coder converter according to claim 4, further including means (37) for causing said main counter (122) to count down at the rate of the said fast clock under the control of the said comparator (35) and of the said main counter (122) to deliver, on identity between the words applied to the comparator (35), the bits of the string whose length is defined by the contents of the said main counter (122) at the rate of the fast clock pulses applied to a count down clock input to the said main counter until it returns to zero.

7. A code converter according to claim 5 or 6 wherein the said transcoder (126) and the said auxiliary transcoder (126') are each constituted by a programmed set of combinatorial logic circuits.

8. A binary converter for converting first binary words into respective second binary words according to a defined transcoding law, the converter comprising:
- a fast clock;
- a main counter having a clock input connected to the fast clock and capable of counting so that its count state passes through all possible second binary words;
- a transcoder applying an inverse law to the defined transcoding law and connected to receive the count state of the main counter to deliver said first words successively in response to the main counter counting through said second words;
- a comparator connected to receive both said first words to be converted and said first words delivered successively by the transcoder to detect identity between simultaneously compared words; wherein the state of the said main counter at the moment when identity is detected by the comparator being the second word which corresponds to the said first word to be converted;
- said converter capable of encoding words which express in binary form the lengths of strings of same level data DA into code words according to a given truncated Huffman code, and decoding the said code words encoded according to the said Huffman code and in the form of data DR, into words which are binary representations of the lengths of strings of same level data,
- said main counter further comprising a counter (22) for counting the lengths of strings of same level data DA, and having its outputs connected to the said transcoder, said transcoder including a set of combinational logic circuits (26) programmed to code the words which it receives into other words in accordance with the said truncated Huffman code; and said coder further including;
- an auxiliary transcoder in the form of a set of logic circuits (26') having inputs connected to the outputs of the said string length counter (22) for data DA for transcoding each word which it receives into an auxiliary word indicative of the length of the corresponding truncated Huffman code word;
- an output register (32) having inputs connected, together with a first group of inputs of said comparator (35), to the outputs of said set of combinatorial logic circuits (26) to receive the code words, said output register (32) controlled by a first incident clock signal to shift out its data at a given rate Hm and to load when a presettable counter (31) passes through the zero state;
- said presettable counter (31) having inputs connected to the outputs of the said auxiliary transcoder (26') to receive said auxiliary words representative of the lengths of the code words, said presettable counter controlled to count down by the said first incident clock signal and to load when it reaches its own zero state;
- controllable means (75) for blocking data at the output from the said output register;
- an input register (110) receiving the data DR at the rate given by a second incident clock signal Hdm, said input register having outputs connected to a second group of inputs to the said comparator (35), and having a counter (111) associated therewith for counting the lengths of each word received in the input register, said comparator being also connected to said received word length counter and to the said auxiliary transcoder (26') to receive the length of the words to be compared;
- a colour bistable (21) connected to respective supplementary inputs to each of the said transcoders (26 and 26') and controlled via a second switching circuit (71) either by a transition detector (20) which receives the data DA to supply the level of the data DA or else from the comparator (35) to supply the level of the data to be reproduced from the data DR;
- a clock signal control blocking bistable (25) associated with an oscillator (Ho) and firstly controlled via a second switching circuit (73) either by said presettable counter (31) passing through zero to provide a coder clock signal HC, or by the string length counter (22) passing through zero to provide said first clock signal HR applied to the count input of the said string length counter (22), and secondly controlled via a third switching circuit (72) either by the transition detector (20) at each detected transition to block the said coder clock signal HC or else by the comparator (35) at each identity to block the said fast clock signal HR and to provide a decoder clock signal HD applied to the count input of said string length counter (22) until this counter returns to zero;
- controllable means (76) for blocking said decoder clock signal HD; and
- wherein said switching circuits being simultaneously controlled by a coder/decoder selection signal for said code converter, said signal also causing data at the output from the output register (32) to be blocked when the code converter is operating as a decoder and blocking the decoder clock signal HD when the code converter is operating as a coder.

9. A binary converter for converting first binary words into respective second binary words according to a defined transcoding law, the converter comprising:
- a fast clock;
- a main counter having a clock input connected to the fast clock and capable of counting so that its count state passes through all possible second binary words;
- a transcoder applying an inverse law to the defined transcoding law and connected to receive the count state of the main counter to deliver said first words successively in response to the main counter counting through said second words;
- a comparator connected to receive the said first words to be converted and said first words delivered successively by the transcoder to detect identity between simultaneously compared words; the state of the said main counter at the moment when identity is detected by the comparator being the second word which corresponds to the said first word to be converted;
- said converter capable of encoding words which express in binary form the lengths of strings of same level data DA into code words according to a given truncated Huffman code, and decoding the said code words encoded according to the said Huffman code and in the form of data DR, into words which are binary representations of the lengths of strings of same level data, said transcoder comprising a set of combinatorial logic circuits (41) programmed to decode the truncated Huffman code word into words representative of the lengths of same level data; and said coder further including:

a first switching circuit (82) for connecting either the outputs of said main counter (244) receiving said fast clock signal or the outputs of an input register (40) which receives the data DR at the rate given by a first incident clock signal Hdm to the inputs of the transcoder (41);

a same level string length counter (222) for the data DA receiving a coder clock signal HC defining the clock rate for the data DA and having outputs connected to a first group of inputs to a second comparator (50) whose second group of inputs is connected to the outputs of said transcoder;

an auxiliary transcoder in the form of a set of logic circuits (226') for transcoding the contents of the string length counter (222) into an auxiliary word representative of the length of the corresponding truncated Huffman code word;

a second switching circuit (81) connecting the outputs of said auxiliary transcoder (226') or the outputs of a counter (44) for counting the length of words formed by the data DR and receiving said first incident clock signal Hdm, to said transcoder (41) to enable a number of inputs to said transcoder corresponding to the length of the word;

a first presettable counter (46) connected to the output of said transcoder (41) to receive the decoded words;

a code word output register (232) connected to said main counter (244) and controlled to shift out its data by a second incident clock signal at a given rate Hd;

a second presettable counter (231) for counting the length of said code word being associated with the code word output register (232) and connected to the outputs of said auxiliary transcoder (226') being controlled to count down by said second incident clock signal, said output register and the said second presettable counter enabled for loading when identity is detected between the words compared by the comparator and said second presettable counter is in the zero state;

a colour bistable (245) connected to a supplementary input of said transcoder (41) and also to a supplementary input of said auxiliary transcoder (226') to supply the level of the data DA or of the data to be reproduced from the data DR, and controlled via a third switching circuit (83) either by a transition detector (220) which receives the data DA or else from said transcoder (41) delivering a decoded word;

means for generating clock signals (224,225, 51, 54, 47) associated with an oscillator (Ho) and firstly controlled by the said comparator (50) and said second presettable counter (231) to count the length of said code word to block said fast clock signal each time identity is detected between the compared words and for as long as said second presettable counter has not returned to the zero state, and generating a coder clock signal HC each time identity is detected between the compared words and said second counter is in the zero state; said means for generating clock signals secondly controlled by the transition detector (220) to clock the coder clock signal HC at each transition; and said means for generating clock signals thirdly controlled by said first presettable counter (46) to count the length of a decoded word to deliver a decoder clock signal HD during its non-zero state;

controllable means (85) for blocking data at the output of the output register (232); and controllable means (86) for blocking said decoder clock signal HD; and said switching circuits being simultaneously controlled in the code converter by a coder/decoder select signal which also controls the blocking of data at the output of the output register (232) when the code converter is operating as a decoder and the blocking of the decoder clock signal HD when the code converter is operating as a coder.

* * * * *